United States Patent
Ake et al.

(10) Patent No.: US 7,323,673 B1
(45) Date of Patent: Jan. 29, 2008

(54) MODULATED LASER LIGHT DETECTOR WITH DISCRETE FOURIER TRANSFORM ALGORITHM

(75) Inventors: DuWain K. Ake, Beavercreek, OH (US); Ayman Hajmousa, Dayton, OH (US)

(73) Assignee: Apache Technologies, Inc., Dayton, OH (US)

( * ) Notice: Subject to any disclaimer, the term of this patent is extended or adjusted under 35 U.S.C. 154(b) by 0 days.

(21) Appl. No.: 11/414,383

(22) Filed: Apr. 28, 2006

Related U.S. Application Data

(63) Continuation-in-part of application No. 11/303,488, filed on Dec. 16, 2005, which is a continuation-in-part of application No. 11/082,041, filed on Mar. 16, 2005, now abandoned.

(51) Int. Cl.
*G01J 1/44* (2006.01)
*H01J 40/14* (2006.01)
*H03F 3/08* (2006.01)

(52) U.S. Cl. .............. 250/214 R; 250/214.1; 708/405; 398/202; 702/77; 702/79; 702/126

(58) Field of Classification Search ............ 250/214 R, 250/214.1, 208.1, 241 AG; 398/183, 187, 398/202, 204, 207; 708/400–409; 372/22, 372/26; 702/75–77, 79, 126, 127, 189, 190, 702/197
See application file for complete search history.

(56) References Cited

U.S. PATENT DOCUMENTS

| | | | |
|---|---|---|---|
| 3,017,046 A | 1/1962 | Runci et al. | |
| 3,469,919 A | 9/1969 | Zellner | |
| 3,708,232 A | 1/1973 | Walsh | |
| 3,727,332 A | 4/1973 | Zimmer | |
| 3,790,277 A | 2/1974 | Hogan | |
| 3,813,171 A | 5/1974 | Teach et al. | |
| 3,887,012 A | 6/1975 | Scholl et al. | |

(Continued)

FOREIGN PATENT DOCUMENTS

GB   2 101 077 A   1/1983

(Continued)

OTHER PUBLICATIONS

"360 degree Machine Guidance" and "Depthmaster" sales literature, by Laser Alignment, Inc. (exact date unknown, but known to be before Jun. 12, 1989).

(Continued)

*Primary Examiner*—Georgia Epps
*Assistant Examiner*—Francis M. LeGasse, Jr.
(74) *Attorney, Agent, or Firm*—Frederick H. Gribbell

(57) ABSTRACT

A modulated laser light detector that converts laser light energy into electrical signals which exhibit a frequency that is substantially the same as the laser light modulation frequency, in which these signals allow the detector unit to determine a position where the laser light is impacting upon a photodiode array. A superheterodyne receiver circuit is used to provide high gain at an improved signal-to-noise ratio to improve the range at which the modulated laser light signal can be reliably detected. Various types of signal detection circuits are available. Various processing algorithms are disclosed, including a Discrete Fourier Transform with a simplified computational algorithm for use with a low-power processor device.

21 Claims, 18 Drawing Sheets

U.S. PATENT DOCUMENTS

| | | |
|---|---|---|
| 3,894,230 A | 7/1975 | Rorden et al. |
| 3,900,073 A | 8/1975 | Crum |
| 3,997,071 A | 12/1976 | Teach |
| 4,029,415 A | 6/1977 | Johnson |
| 4,034,490 A | 7/1977 | Teach |
| 4,040,738 A | 8/1977 | Wagner |
| 4,050,171 A | 9/1977 | Teach |
| 4,129,224 A | 12/1978 | Teach |
| 4,162,708 A | 7/1979 | Johnson |
| 4,231,700 A | 11/1980 | Studebaker |
| 4,273,196 A | 6/1981 | Etsusaki et al. |
| 4,393,606 A | 7/1983 | Warnecke |
| 4,413,684 A | 11/1983 | Duncklee |
| 4,477,168 A | 10/1984 | Hosoe |
| 4,491,927 A | 1/1985 | Bachmann et al. |
| 4,535,699 A | 8/1985 | Buhler |
| 4,604,025 A | 8/1986 | Hammoud |
| 4,674,870 A | 6/1987 | Cain et al. |
| 4,676,634 A | 6/1987 | Petersen |
| 4,726,682 A | 2/1988 | Harms et al. |
| 4,732,471 A | 3/1988 | Cain et al. |
| 4,756,617 A | 7/1988 | Cain et al. |
| 4,829,418 A | 5/1989 | Nielsen et al. |
| 4,884,939 A | 12/1989 | Nielsen |
| 4,907,874 A | 3/1990 | Ake |
| 4,912,643 A | 3/1990 | Beirxe |
| 4,976,538 A | 12/1990 | Ake |
| 5,174,385 A | 12/1992 | Shinbo et al. |
| 5,343,033 A | 8/1994 | Cain |
| 5,471,049 A | 11/1995 | Cain |
| 5,486,690 A | 1/1996 | Ake |
| 5,528,498 A | 6/1996 | Scholl |
| 5,682,311 A | 10/1997 | Clark |
| 5,848,485 A | 12/1998 | Anderson et al. |
| 5,854,988 A | 12/1998 | Davidson et al. |
| 5,886,776 A | 3/1999 | Yost et al. |
| 5,925,085 A | 7/1999 | Kleimenhagen et al. |
| 5,950,141 A | 9/1999 | Yamamoto et al. |
| 5,960,378 A | 9/1999 | Watanabe et al. |
| 6,133,991 A | 10/2000 | Ake |
| 6,263,595 B1 | 7/2001 | Ake |
| 7,012,237 B1 | 3/2006 | Ake |
| 2003/0058446 A1 | 3/2003 | Douglas |
| 2003/0174305 A1 | 9/2003 | Kasper et al. |
| 2003/0202172 A1 | 10/2003 | Douglas |

FOREIGN PATENT DOCUMENTS

JP         402263126 A  *  10/1990

OTHER PUBLICATIONS

"Laserplane Grade-Eye" sales literature, by Spectra-Physics (Oct. 8, 1988).

"Laser Control-Receiver LRE-180/360" sales literature, by MOBA Electronic (exact date unknown, but known to be before Jun. 12, 1989).

"What is a Lock-in Amplifier?" Technical Note TN 1000, by PerkinElmer Instruments (2000).

"Application Note #3 About Lock-In Amplifiers," by PerkinElmer Instruments.

"The Analog Lock-in Amplifier," Technical Note TN 1002, by PerkinElmer Instruments (2000).

"What is a Lock-In Amplifier?" by Boston Electronics Corporation.

"A Lock-in Amplifier Primer," by Princeton Applied Research (1975).

"Explore the Lock-In Amplifier," by EG&G Princeton Applied Research, Scientific Instrument Group (1983).

* cited by examiner

MODULATED LASER LIGHT DETECTOR WITH DISCRETE FOURIER TRANSFORM ALGORITHM

CROSS-REFERENCE TO RELATED APPLICATIONS

The present application is a continuation-in-part to application Ser. No. 11/303,488, titled "MODULATED LASER LIGHT DETECTOR WITH MORE EFFICIENT BEAM DETECTION ALGORITHM," filed on Dec. 16, 2005; which is a continuation-in-part to application Ser. No. 11/082,041, titled "MODULATED LASER LIGHT DETECTOR WITH IMPROVED RANGE," filed on Mar. 16, 2005 now abandoned.

TECHNICAL FIELD

The present invention relates generally to laser light detectors and is particularly directed to laser light detectors of the type which detect modulated laser light energy. The invention is specifically disclosed as a modulated laser light detector that converts laser light energy into electrical signals which exhibit a frequency that is substantially the same as the laser light modulation frequency, and then signal conditions the electrical signals in a manner that allows the detector unit to determine a position where the laser light is impacting upon a photodiode array. The signal conditioning includes a mixer and a filter to improve the signal-to-noise ratio of the received signal, thereby improving the sensitivity or range of the detection portion of the laser light receiver. The invention determines the beam positions of the laser signals striking an array of photosensitive elements, and in some of the embodiments described herein, a software algorithm is used to assist in determining these beam positions. One of the embodiments uses a "software phase locked loop" algorithm; a second algorithm uses a sampling scheme to determine the RMS value of the signals at the IF frequency to determine an effective signal magnitude for each channel; and a third algorithm uses a sampling scheme and calculates a Discrete Fourier Transform based on the signals running at the IF frequency to determine an effective signal magnitude for each channel.

BACKGROUND OF THE INVENTION

Laser alignment systems have been used for years, and some of these systems use a rotating laser light source that periodically sweeps 360°, thereby creating a plane of laser light that can be received and detected by a laser light receiver. Other types of laser alignment systems use a transmitter that projects laser energy continuously in a reference cone, or a reference plane, of light that spreads in all directions about a 360° circle. The range of such detection units, especially when used in direct sunlight, is greatly increased by modulating the laser light source at a predetermined frequency. Such a laser light alignment system using a modulated laser light source is disclosed in U.S. Pat. No. 4,756,617.

It is desirable to increase the effective range of such modulated laser light receivers. One way to do so is to increase the signal-to-noise ratio of the detection circuit.

SUMMARY OF THE INVENTION

Accordingly, it is an advantage of the present invention to provide a modulated laser light detector that can reliably measure the peak magnitudes of received laser light signals at their respective photocells, and thereby reliably indicate the correct grade or elevation where the laser signal impacts the receiver photocell elements.

It is another advantage of the present invention to provide a modulated laser light receiver that can detect the relative magnitudes or strengths of laser light impacting at least two photocell elements of the receiver unit, while using a mixer and a filter circuit to improve the signal-to-noise characteristics, and thereby more accurately detect the peak values of the modulated laser light signals impacting the photocells at greater distances.

It is a further advantage of the present invention to provide a modulated laser light detector that uses a phase locked loop and a synchronous rectifier to improve the low noise characteristics, and thereby more accurately measure the relative strengths of the incoming signals from the photocells at greater distances.

It is yet another advantage of the present invention to provide a modulated laser light detector that uses alternative detection circuitry to reduce the cost of the system, while still utilizing an improved signal-to-noise ratio by use of a superheterodyne receiver, or by using other similar elements such as a mixer and a low pass filter.

It is still another advantage of the present invention to provide a modulated laser light detector that uses a software algorithm to help reduce the cost of the system, in which a "software phase locked loop" is used instead of a hardware phase locked loop, as part of the process used for determining the beam position of the laser light striking the array of photodetector elements of the receiver.

It is yet a further advantage of the present invention to provide a modulated laser light detector that uses a software algorithm to help reduce the cost of the system, in which a software algorithm that determines the root mean square value of multiple instantaneous samples of the received laser light signals at the IF frequencies is used as part of the process used for determining the beam position of the laser light striking the array of photodetector elements of the receiver.

It is still a further advantage of the present invention to provide a modulated laser light detector that uses a software algorithm to help reduce the cost of the system, in which a software algorithm that determines a Discrete Fourier Transform value of multiple instantaneous samples of the received laser light signals at the IF frequencies is used as part of the process used for determining the beam position of the laser light striking the array of photodetector elements of the receiver.

Additional advantages and other novel features of the invention will be set forth in part in the description that follows and in part will become apparent to those skilled in the art upon examination of the following or may be learned with the practice of the invention.

To achieve the foregoing and other advantages, and in accordance with one aspect of the present invention, a modulated light detector is provided, which comprises: (a) at least one light photosensor, which generates at least one first electrical signal when receiving modulated light energy having at least one predetermined range of wavelengths and at least one predetermined range of modulation frequencies; (b) a first filter circuit having a predetermined frequency characteristic, which receives the at least one first electrical signal and outputs a filtered at least one second signal; (c) a mixer circuit that receives the at least one second signal, and receives a third signal having a predetermined, substantially fixed frequency; and which outputs a mixed at least one fourth signal which has a lower frequency component and a higher frequency component; (d) a second filter circuit that receives the at least one fourth signal and filters out the higher frequency component of the at least one fourth signal, and thereby outputs at least one fifth signal related to the lower frequency component of the at least one fourth signal; (e) a signal conversion circuit that converts the at least one fifth signal into at least one sixth signal having a substantially DC voltage that is related to a signal strength of the at least one fifth signal; and (f) at least one signal strength detector that inspects the substantially DC voltage of the at least one sixth signal, and thereby determines a relative strength of the received modulated light energy.

In accordance with another aspect of the present invention, a modulated light detector is provided, which comprises: (a) at least one light photosensor, which generates at least one first electrical signal when receiving modulated light energy having at least one predetermined range of wavelengths and at least one predetermined range of modulation frequencies; (b) a superheterodyne receiver circuit that receives the at least one first electrical signal and outputs at least one second signal having a frequency within a second, different predetermined range; (c) a signal conversion circuit that converts the at least one second signal into at least one third signal having a substantially DC voltage that is related to a signal strength of the at least one second signal; and (d) at least one signal strength detector that inspects the substantially DC voltage of the at least one third electrical signal, and thereby determines a relative strength of the received modulated light energy.

In accordance with yet another aspect of the present invention, a method for detecting a modulated light beam is provided, in which the method steps comprise: (a) receiving an electromagnetic laser signal having at least one predetermined range of wavelengths and at least one predetermined first range of modulation frequencies, and converting the electromagnetic laser signal into a first electrical signal; (b) converting the first electrical signal from the at least one predetermined first range of modulation frequencies to a second signal having at least one predetermined second, different range of frequencies that is related to the at least one predetermined first range of modulation frequencies; and (c) detecting a signal strength of the second signal, and thereby determining a relative strength of the received modulated electromagnetic signal.

In accordance with a further aspect of the present invention, a method for detecting a modulated light beam is provided, in which the method steps comprise: (a) receiving an electromagnetic laser signal having at least one predetermined range of wavelengths and at least one predetermined first modulation frequency, and converting the electromagnetic laser signal into a first electrical signal; (b) converting the first electrical signal from the at least one predetermined first modulation frequency to a second signal having at least one predetermined second, different frequency that is related to the at least one predetermined first modulation frequency; and (c) sampling, over a sampling time interval, the second signal at a rate that is an integer multiple of the at least one second frequency, and determining a substantially instantaneous magnitude of the sampled second signal, thereby deriving a value A that represents the substantially instantaneous magnitude of the sampled second signal; (d) squaring A, and summing the value $A^2$ for each the sampled second signal over at least one complete period of the second frequency, thereby deriving a value B; (e) dividing B by the number of samples taken of signal A, thereby deriving a value C; (f) taking the square root of C, thereby deriving a value D; and (g) using the value D to substantially represent a steady state signal magnitude that is used as a representation of a signal strength of the second signal over the sampling time interval, and thereby determining a relative strength of the received modulated electromagnetic signal.

In accordance with yet a further aspect of the present invention, a modulated light detector is provided, which comprises: (a) at least one light photosensor, which generates at least one first electrical signal when receiving modulated light energy having at least one predetermined range of wavelengths and at least one predetermined range of modulation frequencies; (b) a first filter circuit having a predetermined frequency characteristic, which receives the at least one first electrical signal and outputs a filtered at least one second signal; (c) an intermediate frequency stage that (i) mixes the at least one second signal with a predetermined third signal to create a mixed signal, (ii) filters the mixed signal, and (iii) outputs at least one fourth signal, which has a substantially predetermined lower frequency component of the mixed signal; and (d) a processing circuit that is configured to: (i) receive the at least one fourth signal and sample it at a rate that is an integer multiple of the frequency of the substantially predetermined lower frequency component of the mixed signal; (ii) determine a substantially instantaneous magnitude of the sampled at least one fourth signal, thereby deriving a value A that represents the substantially instantaneous magnitude of the sampled at least one fourth signal; (iii) square a value of A, and sum the value $A^2$ for each the sampled at least one fourth signal over at least one complete period of the predetermined lower frequency component of the mixed signal, thereby deriving a value B; (iv) divide a value of B by the number of samples taken of signal A, thereby deriving a value C; (v) take the square root of a value of C, thereby deriving a value D; and (vi) use the value of D to represent a substantially steady state signal magnitude that is used as a representation of a signal strength of the at least one fourth signal, and thereby determine a relative strength of the received modulated light energy.

In accordance with still a further aspect of the present invention, a modulated light detector is provided, which comprises: (a) at least one light photosensor, which generates at least one first electrical signal when receiving modulated light energy having at least one predetermined range of wavelengths and at least one predetermined range of modulation frequencies; (b) a superheterodyne receiver circuit that receives the at least one first electrical signal and outputs at least one second signal having a frequency within a second, different predetermined range; (c) a sampling circuit that, over a sampling time interval, samples the at least one second signal at a rate that is an integer multiple of the at least one second predetermined frequency range, thereby determining a substantially instantaneous magnitude of the sampled second signal for a plurality of samples; and (d) a signal conversion circuit that determines a root mean square value of the plurality of samples of the sampled second signal, thereby determining a substantially steady state magnitude that is related to a signal strength of the at least one second signal, and thus determining a relative strength of the received modulated light energy.

In accordance with still another aspect of the present invention, a method for detecting a modulated light beam is provided, in which the method steps comprise: (a) receiving an electromagnetic laser signal having at least one predetermined range of wavelengths and at least one predetermined first modulation frequency, and converting the electromagnetic laser signal into a first electrical signal; (b) converting the first electrical signal from the at least one predetermined first modulation frequency to a second signal having at least one predetermined second, different frequency that is related to the at least one predetermined first modulation frequency; (c) sampling, over a sampling time interval, the second signal at a rate that is an integer multiple of the at least one second frequency, and determining a substantially instantaneous magnitude of the sampled second signal, thereby deriving multiple values A that each represent the substantially instantaneous magnitude of the sampled second signal; (d) determining a Discrete Fourier Transform (DFT) value for each the sampled second signal A over at least one complete period of the second frequency, thereby deriving multiple DFT values B; (e) after all samples are taken for a predetermined sample period, determining real and imaginary components of the multiple DFT values B, thereby deriving multiple values C; (f) determining a magnitude of a spectral component of the multiple values C, thereby deriving multiple values D; and (g) using one of the values D to substantially represent a steady state signal magnitude that is used as a representation of a signal strength of the second signal over the sampling time interval, and thereby determining a relative strength of the received modulated electromagnetic signal.

In accordance with yet another aspect of the present invention, a modulated light detector is provided, which comprises: (a) at least one light photosensor, which generates at least one first electrical signal when receiving modulated light energy having at least one predetermined range of wavelengths and at least one predetermined range of modulation frequencies; (b) a first filter circuit having a predetermined frequency characteristic, which receives the at least one first electrical signal and outputs a filtered at least one second signal; (c) an intermediate frequency stage that (i) mixes the at least one second signal with a predetermined third signal to create a mixed signal, (ii) filters the mixed signal, and (iii) outputs at least one fourth signal, which has a substantially predetermined lower frequency component of the mixed signal; and (d) a processing circuit that is configured to: (i) receive the at least one fourth signal and sample it at a rate that is an integer multiple of the frequency of the substantially predetermined lower frequency component of the mixed signal; (ii) determine a substantially instantaneous magnitude of the sampled at least one fourth signal, thereby deriving multiple values A that each represent the substantially instantaneous magnitude of the sampled at least one fourth signal; (iii) determine a Discrete Fourier Transform (DFT) value for each the sampled second signal A over at least one complete period of the second frequency, thereby deriving multiple DFT values B; (iv) after all samples are taken for a predetermined sample period, determine real and imaginary components of the multiple DFT values B, thereby deriving multiple values C; (v) determine a magnitude of a spectral component of the multiple values C, thereby deriving multiple values D; and (vi) use one of the values D to represent a substantially steady state signal magnitude that is used as a representation of a signal strength of the at least one fourth signal, and thereby determine a relative strength of the received modulated light energy.

Still other advantages of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 1:
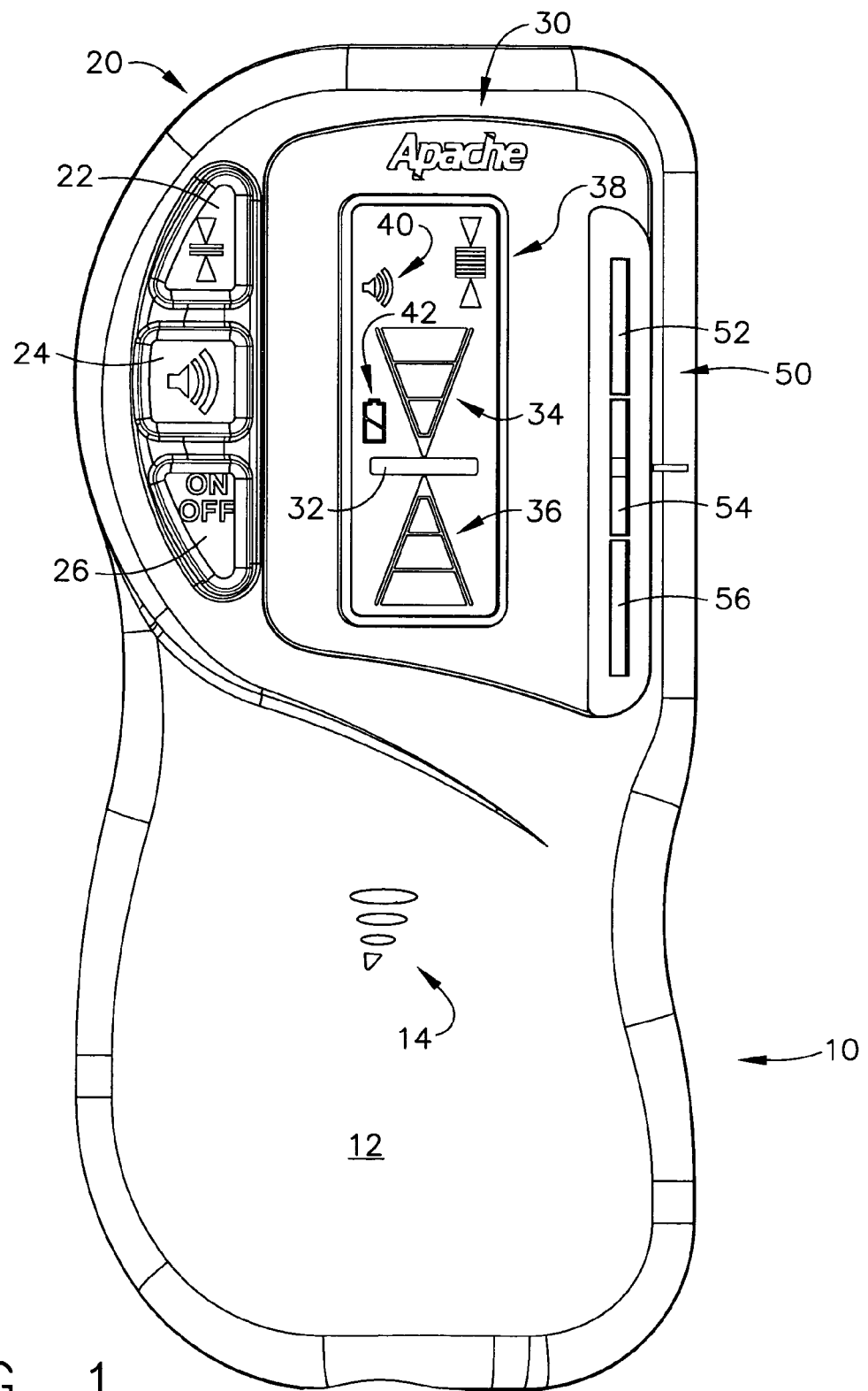
FIG. 1 is a front elevational view of a hand-held modulated laser light detector, as constructed according to the principles of the present invention.

Referring now to FIG. 1, a modulated laser beam detector unit is illustrated, generally designated by the reference numeral 10. Its front outer surface at 12 is typically a plastic molded housing, which has some openings at 14 to allow for an internal beeper or other type of audio output device to be used. A set of pushbutton switches generally designated by the reference numeral 20 are located along the upper left-hand side of the case. These switches are designated by the reference numerals 22, 24, and 26, in which the top switch 22 may act as a dead band control switch on some models of laser receivers sold by Apache Technologies, Inc., the middle switch 24 enables the beeper (or other type of audio output device) to be activated, and the bottom switch 26 is the unit's ON-OFF switch.

The modulated laser beam detector 10 also includes a liquid crystal display, generally designated by the reference numeral 30. On this LCD display 30 there are several symbols that provide information to the user. The "grade" symbols are designated at the reference numerals 32, 34, and 36, in which the middle symbol 32 would be energized when the laser beam detector 10 is positioned "ON-GRADE" with respect to the plane of light being emitted by a modulated laser light source (not shown). The LCD "arrowhead" triangular-shaped indicators 34 and 36 are, respectively, indicators of above-grade and below-grade. In the illustrated embodiment of the laser detector 10, there are three different above-grade indicators and three different below-grade indicators, thereby providing the user with an indication as to how close or how far the detector 10 is from being on-grade.

A battery symbol at 42 is illustrated on the LCD display 30, which will be visible when the battery that powers the unit 10 has been depleted past a predetermined point. The "speaker" symbol 40 is also part of the LCD display 30, which is visible when the beeper (or speaker) has been enabled (by pushing the button 24). On some models, the symbol at 38 on the LCD 30 provides an indication as to the width for the dead band setting.

On FIG. 1, the modulated laser beam detector 10 includes a set of photodetectors, generally designated by the reference numeral 50. In an exemplary embodiment, these photodetectors comprise multiple photocells, such as photodiodes, and they are arranged in a vertical line (as seen in FIG. 1), in which the upper photodiode is at 52, the bottom photodiode is at 56, and the middle photodiode is at 54. The photodiodes in this array are used to intercept the plane of laser light being emitted by the laser light source (not shown), and these photodiodes can output an electrical current, and they are used in the electronic control circuit of the receiving device 10 in a manner that is described in a schematic diagram that starts on FIG. 6. As can be seen in FIG. 1, the middle photodiode 54 is actually comprised of six different photocell sections, each of which represents a separate electrical component, and which are also illustrated on the schematic diagram of FIG. 6.

In this patent document, the terms "photocell" and "photodiode" both refer to an optoelectronic device that produces some form of an electric signal when optical energy impacts such optoelectronic device. A photodiode is a type of photocell, which is a more generic term. The type of electrical signal produced by a photocell need not necessarily be independently sourced to the photocell itself. For example, if a photocell merely changes electrical resistance, then it would not by itself produce an electrical signal. However, if a bias current or a bias voltage is applied to such a resistance-sensitive photocell, then it truly would become an optoelectronic device of the type that could be used in the present invention.

It will be understood that the photodetectors 50 do not necessarily need to consist of photodiodes. Other types of photosensitive components could be used, including phototransistors and photovoltaic cells, which can be considered equivalents to photodiodes for use in the present invention. Essentially any type of optoelectronic component could be used in the present invention, so long as it is "sensitive" to electromagnetic radiation (i.e., such that it will vary its resistance, its current output, or its voltage output as it receives a varying quantity of photons). Such optoelectronic devices do not necessarily have to exhibit a linear response to the received electromagnetic radiation, although such a linear response is generally helpful when determining the strength of the optical energy (i.e., electromagnetic radiation) being received. It will also be understood that the photodetectors 50 do not necessarily have to be particularly sensitive to collimated light in situations where the present invention may be used to detect non-laser light sources. However, for most commercial applications of the present invention, a laser light source is generally preferred, and the photodetectors 50 would typically be designed to be sensitive to such laser energy.

Figure 2:
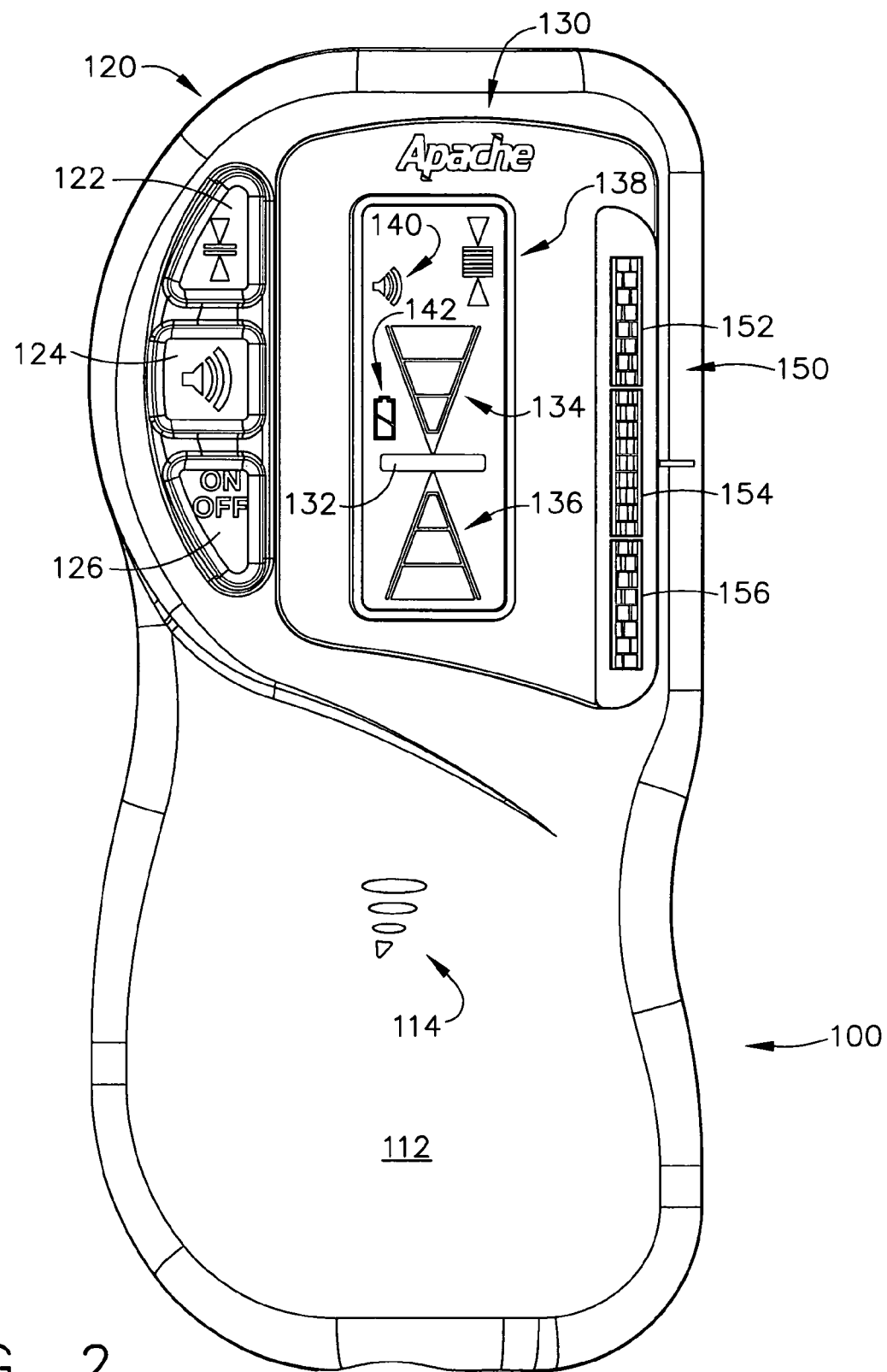
FIG. 2 is another front view of an alternative embodiment for a hand-held modulated laser beam detector, in which an alternative photodiode array is constructed of a number of individual photocell segments.

Referring now to FIG. 2, an alternative embodiment for a modulated laser beam detector is illustrated, generally designated by the reference numeral 100. This photodetector includes a front outer case at 112, and a set of holes for a speaker or beeper at 114. There is also an array of pushbuttons at 120, a liquid crystal display at 130, and an array of photodetectors at 150. The pushbutton switches 122, 124, and 126 have essentially the same functions as the similar switches 22, 24, and 26 that were found on the device 10 illustrated in FIG. 1. The LCD display 130 also has similar capabilities and symbols, including the grade symbols 132, 134, and 136, the low battery symbol 142, the speaker enabled symbol 140, and the dead band status symbol 138.

The main difference between this second embodiment 100 and the first embodiment 10 is the actual photodiode array 150. As can be seen by inspecting FIG. 2, there are again three major photodiode sections at 152, 154, and 156. However, each of these individual photodiode sections is broken into many small photocell segments, which provides for a more accurate laser receiver that can reduce shading effects of the photocells. The principles of this type of photocell design are disclosed in detail in U.S. Pat. No. 6,133,991, titled MULTI-SEGMENT COMPOSITE PHOTOCELL DEVICE, which is commonly assigned to Apache Technologies, Inc. of Dayton, Ohio.

Figure 3:
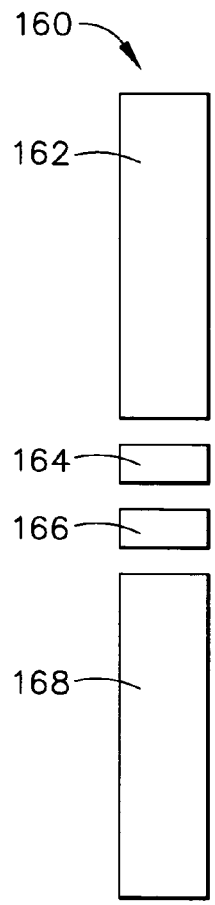
FIG. 3 is a diagrammatic view of another alternative type of photodiode array, having two large cells and two middle small cells, usable with the present invention.

The different types of photocell arrangements of the embodiments 10 and 100 are merely possible examples for use with the electronics of the present invention. Other example photocell array patterns are disclosed on FIGS. 3, 4, and 5. Referring now to FIG. 3, a four-segment photocell array is illustrated, generally designated by the reference numeral 160. The top photocell is 162, the bottom photocell is 168, and there are two "middle" photocells 164 and 166. This type of photocell configuration has been disclosed in U.S. Pat. No. 5,486,690, titled METHOD AND APPARATUS FOR DETECTING LASER LIGHT, which is commonly assigned to Apache Technologies, Inc. of Dayton, Ohio. Further possible photodetectors that could be used with the present invention are described in published patent applications, No. US 2003/0058446 A1, No. US 2003/0202172 A1, and No. US 2003/0174305 A1.

Figure 4:
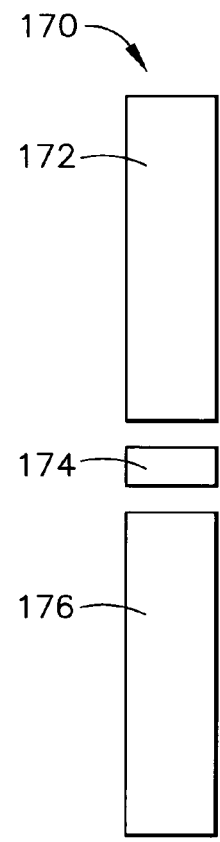
FIG. 4 is a diagrammatic view of yet another alternative photodiode array, having two large cells and one middle small cell, usable with the present invention.
Figure 5:
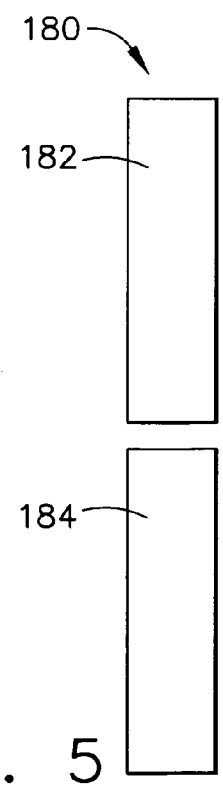
FIG. 5 is a diagrammatic view of a set of two photocells, in which there are two large cells with no intermediate smaller cell, usable with the present invention.

Referring now to FIG. 4, a three-segment photocell array is generally designated by the reference numeral 170, which has a top photocell 172, a bottom photocell 176, and a smaller middle photocell 174. As another example of the flexibility of the present invention, the photocell array 180 of FIG. 5 only includes two fairly large photocell segments, at 182 and 184. In this design, there are no smaller "mid-cells."

Figure 6:
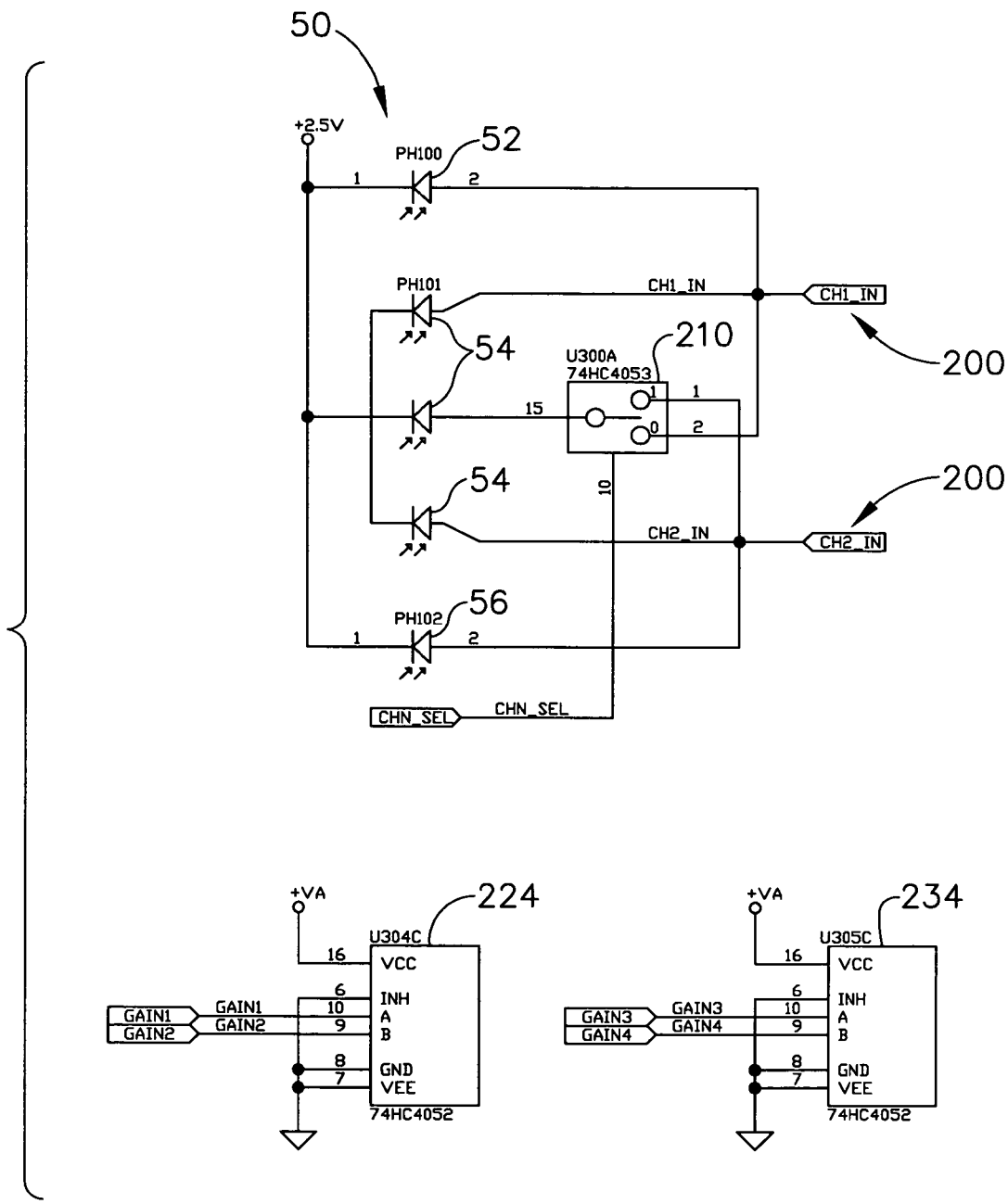
FIGS. 6-18 are an electrical schematic diagram of a portion of the electrical circuit used in the modulated beam detector of FIG. 1.

FIGS. 6-17 illustrate a rather complex electrical schematic diagram, starting on FIG. 6. The input photocells are illustrated along the left-hand side of FIG. 6, and these photocells (e.g., photodiodes) as a single array are generally designated by the reference numeral 50. On FIG. 6, there are two "outer" photocells at 52 and 56, and also a set of three individual photocells that act as the "middle" photocell 54, as seen on FIG. 1. The output of one of the three "middle" photocells 54 is switched by an analog multiplexer (or analog switch) 210 to create two channels of input signals 200. The analog multiplexer 210 is controlled by a channel select signal that is output by a microprocessor unit 280 (see FIG. 12), which periodically changes the state of the multiplexer internal "switch contact," so that the photocell input signals can be properly apportioned to a "channel 1" signal and a "channel 2" signal, which in turn provides an indication as to the position, or level, that the laser light is striking the photocell array 50.

Figure 7:
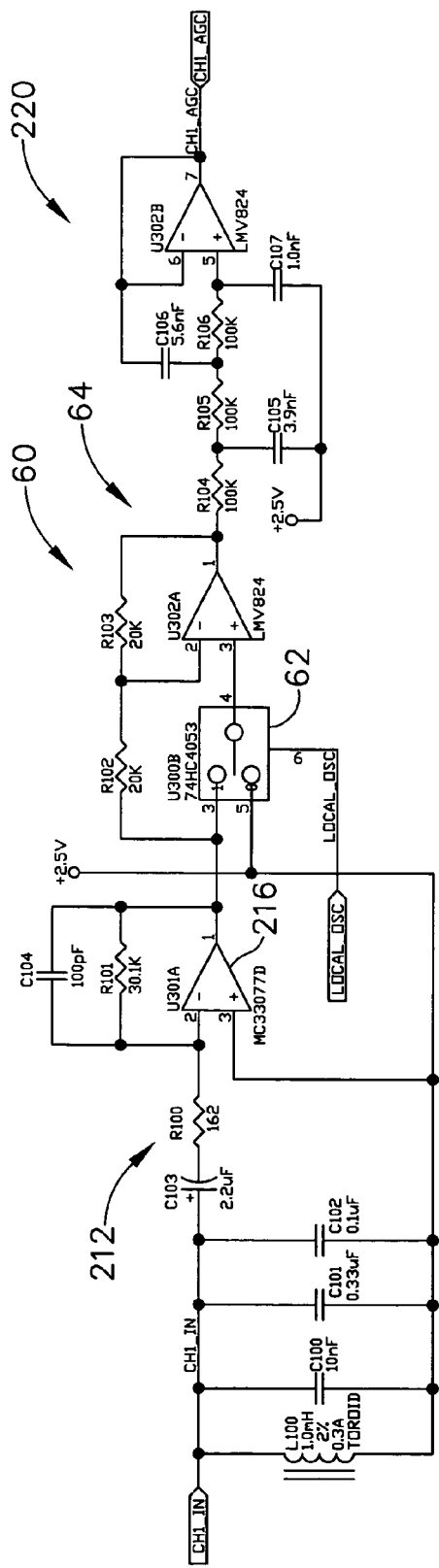
Figure 8:
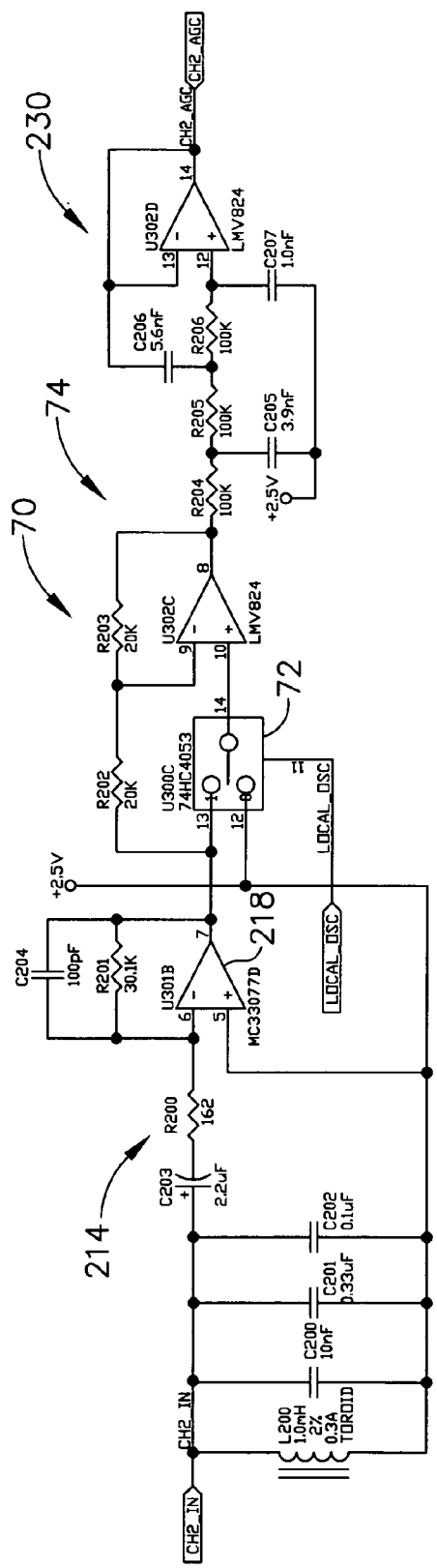

The electrical signals that are output from the analog switches are split into channel 1 and channel 2 signals, as noted above, and these are then directed to two band pass filters 212 and 214, respectively, illustrated on FIGS. 7 and 8. The outputs of these band pass filters 212 and 214 are directed to a set of low noise amplifiers at 216 and 218, respectively, which also are depicted on FIGS. 7 and 8. The output signals from the low noise amplifiers 216 and 218 of the illustrated embodiment typically have an output (or transfer) impedance of about 26.7 kOhms, and a maximum output voltage amplitude of about 420 mV peak to peak, under conditions where laser light is striking the photodiode array 50.

The bandpass filters 212 and 214 typically would be tuned to a predetermined frequency, such as 8.2 kHz. For other types of laser receiver applications, the tuned bandpass filters might be set to a different frequency, such as 7.8 kHz. For the purposes of describing the present invention, it will be assumed that the bandpass filter center frequency is 8.2 kHz, which will be used in conjunction with other portions of the circuit to be described below. In general, the center frequency of the bandpass filters would correspond to the modulation frequency of the laser light being received at the photocells.

The output signals from the low noise amplifiers 216 and 218 are respectively directed to two mixers 60 and 70, which are depicted on FIGS. 7 and 8. These mixers 60 and 70 also receive a square wave signal referred to on the drawings as "LOCAL OSC," which is a "local" oscillator signal. In the illustrated embodiment, this local oscillator signal runs at a frequency of 8.0 kHz (i.e., at a substantially fixed frequency), and is directed into another set of analog multiplexers 62 and 72 (see FIGS. 7 and 8). The output of mixers 60 and 70 are signals at 64 and 74 in the figures that have frequency components that run at both 200 Hertz and 16.2 kHz. These two signals 64 and 74 are each directed to a low pass filter 220 or 230, respectively (see FIGS. 7 and 8).

In the illustrated embodiment, each of the low pass filters 220 and 230 represents a 3-pole Bessel low pass filter having a corner frequency of 400 Hertz. This will effectively filter out the 16.2 kHz component of the output of mixers 60 and 70, thereby leaving only the 200 Hz component of those signals. This 200 Hz signal has a frequency that is substantially the absolute value of the difference in frequencies between the input signal (referred to on FIG. 7 as "CH1_IN") and the local oscillator signal (referred to as "LOCAL OSC").

Figure 9:
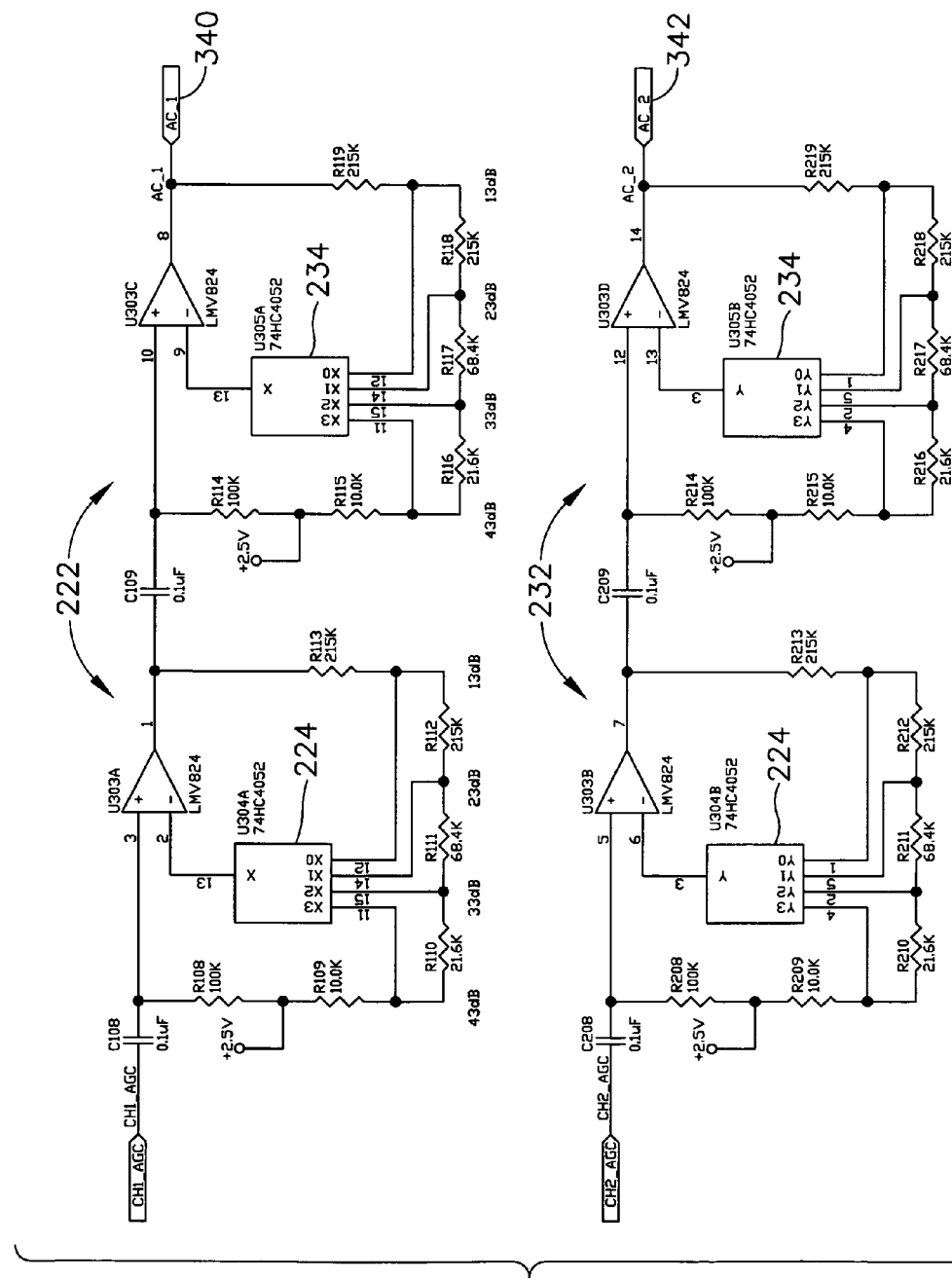

In the illustrated embodiment, the output signals from the low pass filters 220 and 230 are directed to an automatic gain control circuit, such as viewed on FIG. 9. It should be noted that the low pass filter circuits 220 and 230 essentially act as an IF (Intermediate Frequency) stage on the output side of the mixer. A typical IF stage might have a bandpass filter rather than a low pass filter, and such a configuration would also work in the present invention. The mixers 60 and 70 in combination with the filters 220 and 230 essentially act as a superheterodyne receiver, which provides a very high gain and a significant signal-to-noise ratio. It will be understood that other circuit configurations also could be used to achieve the high gain and beneficial signal-to-noise ratios in the circuits illustrated herein, without departing from the principles of the present invention.

The two filtered signals leave FIGS. 7 and 8 as signals called "CH1-AGC" and "CH2-AGC" for Channels 1 and 2, respectively, and then are directed onto FIG. 9 to a set of adjustable gain amplifiers that are controlled by the microprocessor or microcontroller of the system. As these signals arrive on FIG. 9, their minimum level would be a signal of about 1.58 mV peak-to-peak, and their maximum signal level would be about 5 mV peak-to-peak in the illustrated embodiment. A set of analog switches 224 and 234 are used to connect each of the gain amplifiers to the appropriate set of resistors in the feedback loop of these amplifiers, specifically the amplifiers for Channel 1 being designated at the reference numeral 222, while the amplifiers for Channel 2 are designated by the reference numeral 232. These analog switches 224 and 234 are controlled by signals from the microprocessor denoted as "GAIN 1," "GAIN 2," "GAIN 3," and "GAIN 4." The circuit controlling the logic/control inputs of analog switches 224 and 234 is depicted on FIG. 6.

In the illustrated embodiment, each of the gain amplifiers has an adjustable gain, depending on the settings of the analog switches, of 13 dB, 23 dB, 33 dB, or 43 dB. Thus the maximum gain of two in-series amplifiers is 86 dB, which is a gain of 19,881. The amplifiers of the illustrated embodiment have a gain bandwidth of about 1.1 MHz. Of course, other amplification factors could be used, and other circuitry for constructing automatic gain controllers could be used, all without departing from the principles of the present invention.

Figure 11:
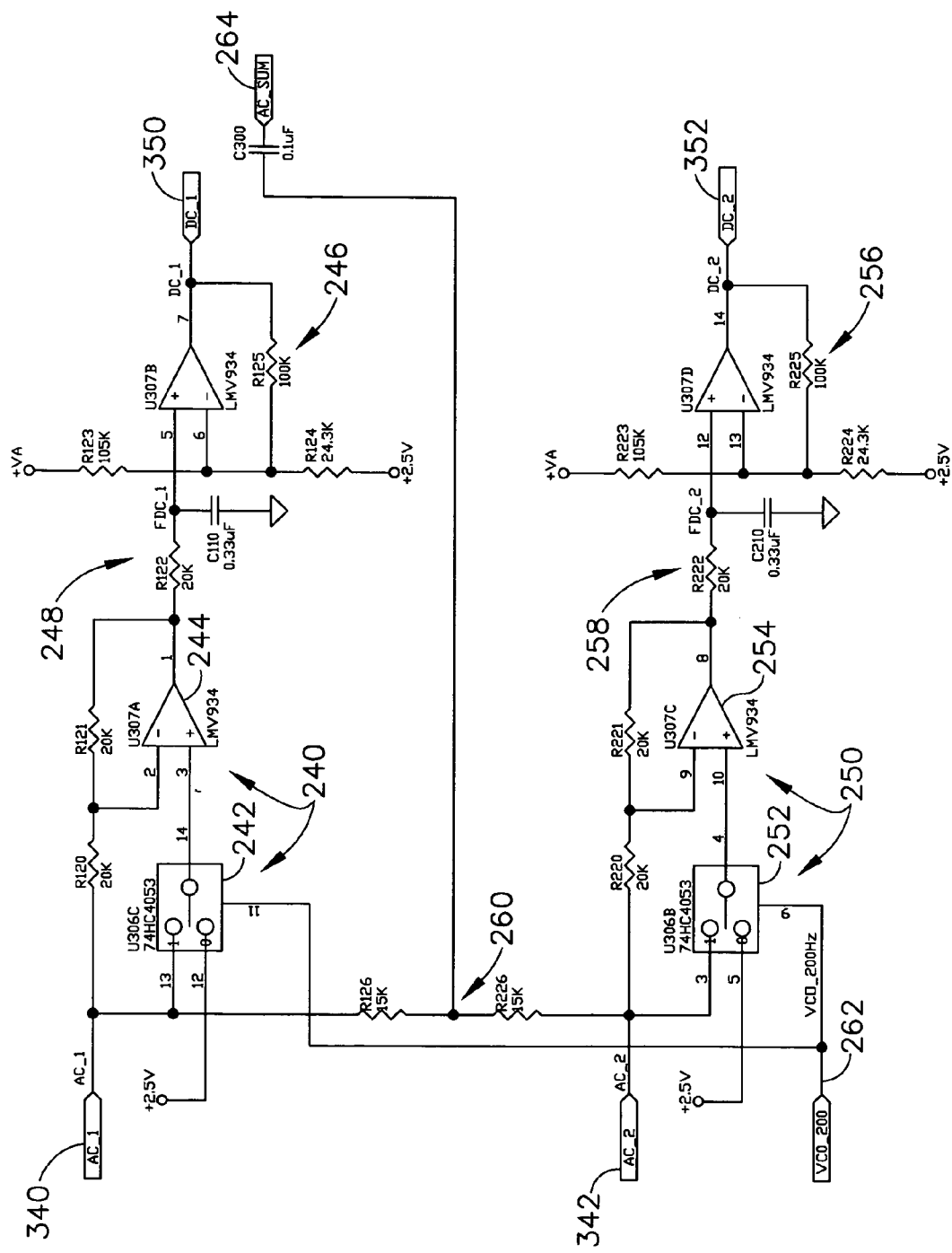

The two signal channels are now referred to as "AC 1" and "AC2" and are also designated by the reference numerals 340 and 342, respectively. These signals now leave FIG. 9, and are directed to FIG. 11. Referring now to FIG. 11, the two signals 340 (AC 1) and 342 (AC2) are directed into a pair of synchronous rectifiers 240 and 250, respectively. For the channel 1 rectifier 240, there is a two-input analog multiplexer at 242, which sends its output signal to a gain amplifier 244. The multiplexer 242 is controlled by a signal "VCO-200 HZ" along a signal pathway 262, which controls which of the two inputs will be sent through to the output of the multiplexer 242 and into the positive input of the operational amplifier 244. The output signal of the op-amp 244 is then directed into another low pass filter 248 with a gain amplifier at 246.

The VCO-200 HZ control signal 262 nominally consists of a square wave that is output from a phase locked loop, which is described below. When the VCO-200HZ signal 262 is in its Logic 1 state, then the op-amp 244 acts as a voltage follower, thus having a designed optimal voltage gain of +1.

When the VCO-200HZ signal 262 is at its Logic 0 level, then a reference voltage level that is equal to about one-half of the power supply rail for these amplifiers is sent through the multiplexer 242 to the positive input of the op-amp 244. Since the power supply rails for the op-amp 244 are at +5 volts DC and ground in this exemplary circuit, the reference voltage is at about 2.5 volts DC, and acts as a virtual ground for this op-amp stage. In this circuit, the two resistors R309 and R313, by virtue of being substantially equal in resistance value, will make op-amp 244 into a gain amplifier having a designed optimal voltage gain of −1.

The overall effect of this circuit 240 is to act as a synchronous low noise rectifier and, by switching the state of the VCO-200 HZ signal in sync with the zero-crossings of the sinusoidal or "near-sine" wave output from the low pass filters 220 and 230, the sinusoidal wave signal 340 that is output by the automatic gain-controlled amplifier 222 is synchronously rectified so that the output signal from the op-amp 244 exhibits a half wave peak-to-peak voltage that is approximately one-half of the peak-to-peak voltage of the full sinusoidal wave that travels through the multiplexer 242 from amplifier 222. Since this sinusoidal wave is now rectified, there are twice as many positive-going one-half "sine" waves in the positive quadrant, and there will be virtually no negative quadrant "sine" wave voltages at the output of the synchronous rectifier circuit 240. The output from the op-amp 244 is directed to another low pass filter 248 with a gain amplifier circuit 246, which essentially demodulates the rectified "half-sine" wave into a DC voltage, having a magnitude that is related to the strength of the laser light energy received at the photocells. The output signal from the amplifier circuit 246 is designated as signal "DC1," also as reference numeral 350, on FIG. 11.

The similar signal 342 (AC2) for channel 2 drives into another two-input multiplexer 252 and another gain amplifier (or op-amp) 254. These are some of the major components of the second synchronous rectifier, generally designated by the reference numeral 250. The output from the op-amp 254 is directed to another low pass filter 258 with a gain amplifier circuit 256, which also essentially demodulates the rectified "half-sine" wave into a DC voltage, and exhibits a magnitude that is related to the strength of the laser light energy received at the photocells. The output signal from the amplifier circuit 256 is designated as signal "DC2," also as reference numeral 352, on FIG. 11.

The two "sine" waves that come into the synchronous rectifiers 240 and 250 are also directed to a summing circuit 260. These signals travel through a set of resistors and a capacitor, before being sent as a "summed AC" signal 264 to a phase locked loop circuit, which will be described immediately below.

Figure 10:
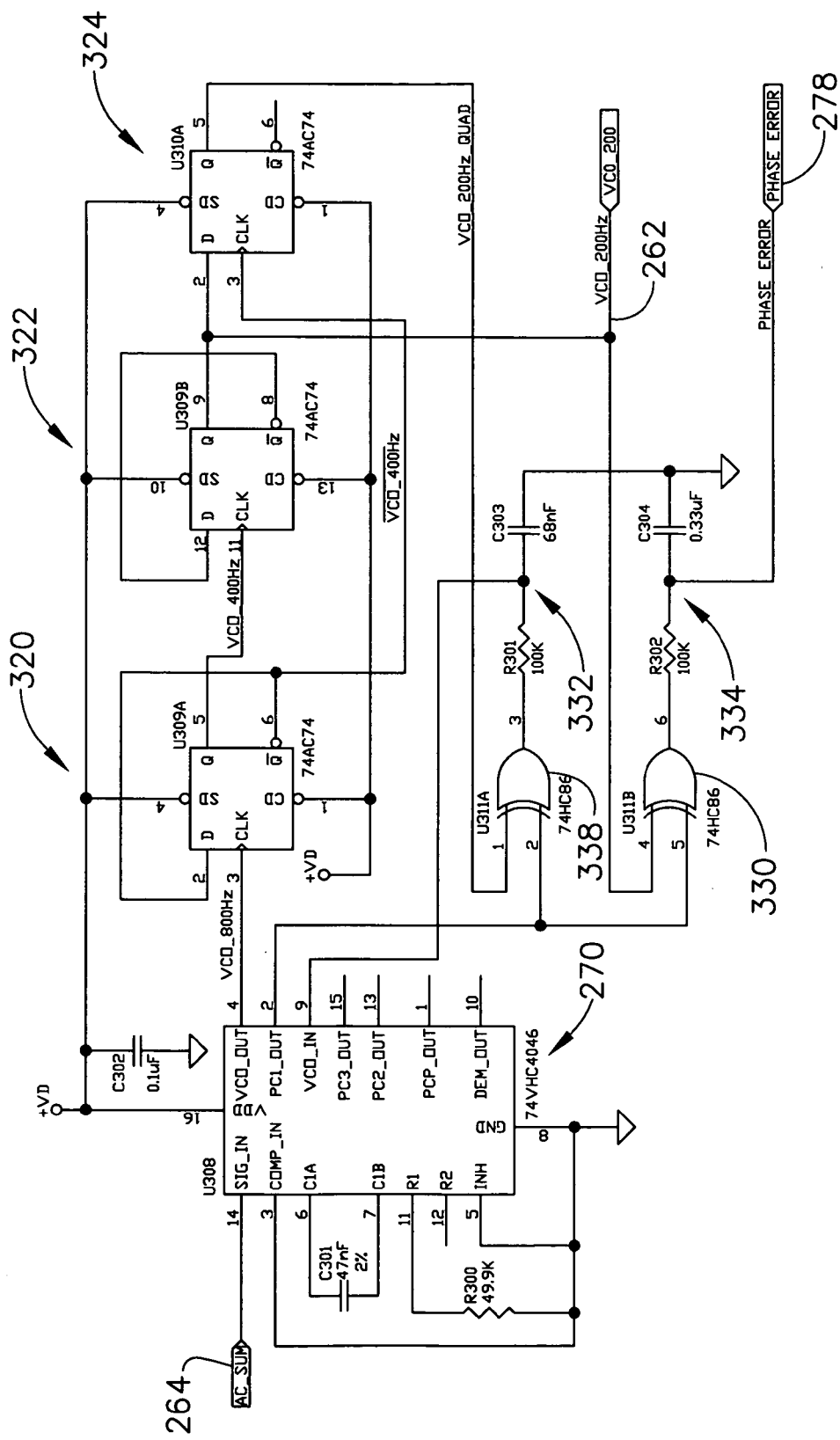

A phase locked loop circuit (PLL) and a "lock detect" circuit are illustrated on FIG. 10, and are generally designated by the reference numeral 270. The summed AC signal 264 ("AC-SUM") is used to provide information to the phase locked loop, and this AC-SUM signal 264 will provide some type of AC waveform if either one of the channels is outputting a voltage, regardless as to which exact set of photodiodes in the array 50 are being impacted by the modulated laser beam. The phase locked loop 270 is utilized to determine if the proper modulated signal is being received at the photodiode array 50, and if so, attempts to bring the overall receiver circuit of the detector 10 into a synchronous lock situation with the incoming modulated laser beam signal.

One of the outputs from the phase locked loop chip 270 is referred to as "VCO-OUT" and represents a signal that would run at about 800 Hz in a situation where the received modulated laser light signal has a frequency of approximately 8.2 kHz. The output of the mixer would typically comprise a signal at 200 Hz after it passed through the low pass filter 220. The 800 Hz VCO-OUT signal drives into a D flip-flop circuit at 320 (see FIG. 10) which acts as a divide-by-two frequency divider, and the output of that flip-flop is a signal of approximately 400 Hz (designated "VCO-400HZ"), which drives into a second D flip-flop circuit 322. An inverted (second) signal of approximately 400 Hz is also generated by flip-flop 320 (designated "NOT VCO-400HZ"), which drives an input of a flip-flop 324. Flip-flop 322 also acts as a divide-by-two frequency divider, and its output generates a signal designated as "VCO-200HZ," which is also the signal 262 that drives the multiplexers 242 and 252 of the synchronous rectifiers 240 and 250, discussed above in reference to FIG. 11.

The VCO-200HZ signal and the NOT VCO-400HZ signal both drive into a third D flip-flop 324, which outputs another 200 Hz signal (designated "VCO-200HZ QUAD") that is 90° out of phase with the VCO-200HZ signal 262. The 200 Hz signals VCO-200HZ and VCO-200 HZ QUAD comprise a quadrature set of signals. The two 200 Hz signals (i.e., VCO-200HZ and VCO-200HZ QUAD) drive into a pair of Exclusive-OR (XOR) gates at 330 and 338. The XOR gate 338 receives the VCO-200HZ QUAD signal and a signal "PC1-OUT" from the phase locked loop chip 270; signal PC1-OUT is a digital signal corresponding to the AC-SUM signal 264. The XOR gate 338 acts as the phase comparator for the phase locked loop circuit, and its output signal is directed through a loop filter 332, and then back to the phase locked loop chip 270 as the VCO control signal.

The XOR gate 330 receives the VCO-200 HZ signal and the PC1-OUT signal as inputs. Its output signal is directed through a low pass filter circuit 334, and becomes a "phase error" signal 278 that is directed to the system controller circuit, and is used by the microprocessor (or microcontroller) to determine whether or not the phase locked loop is currently in a locked state.

Figure 12:
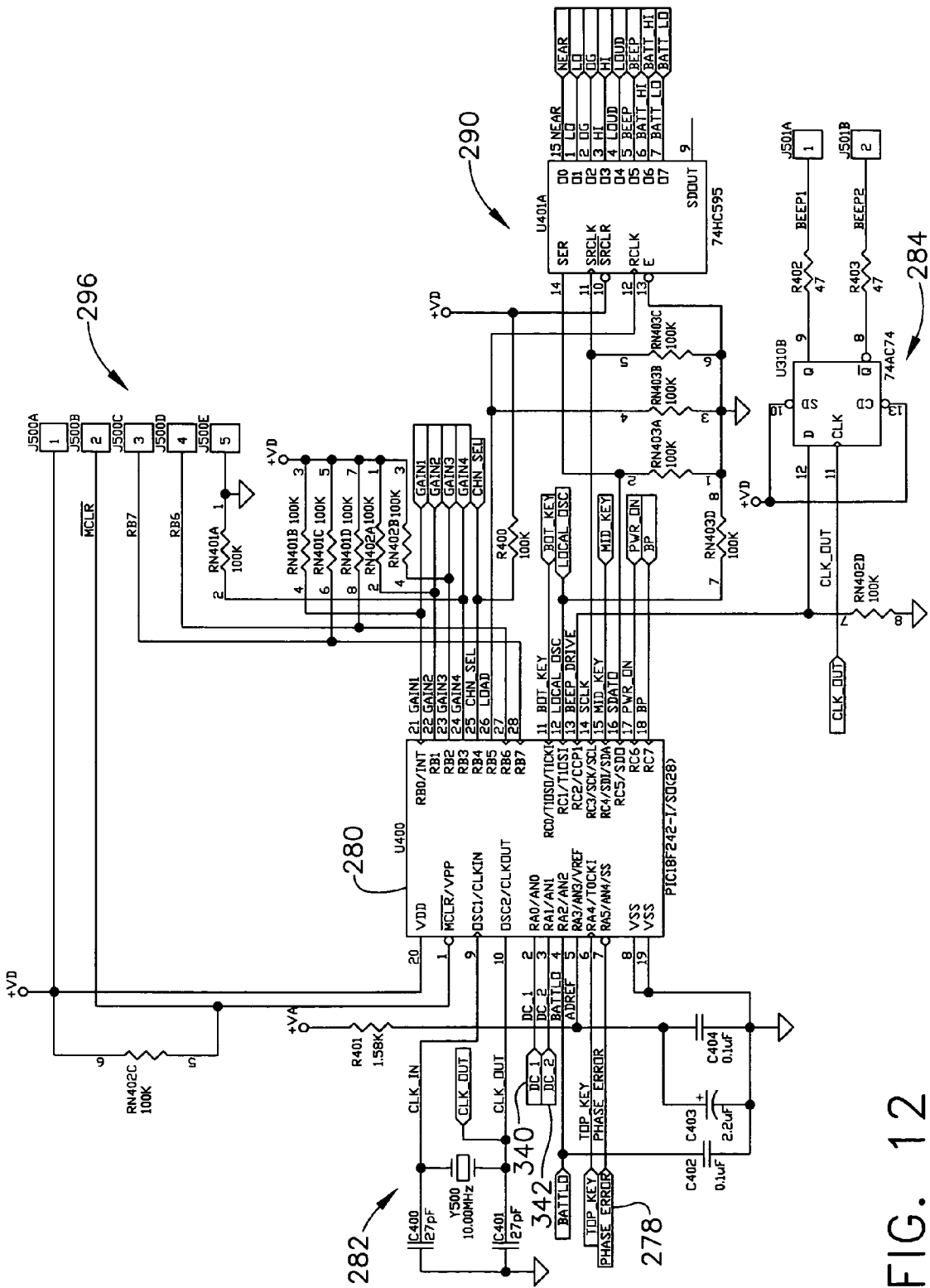
Figure 14:
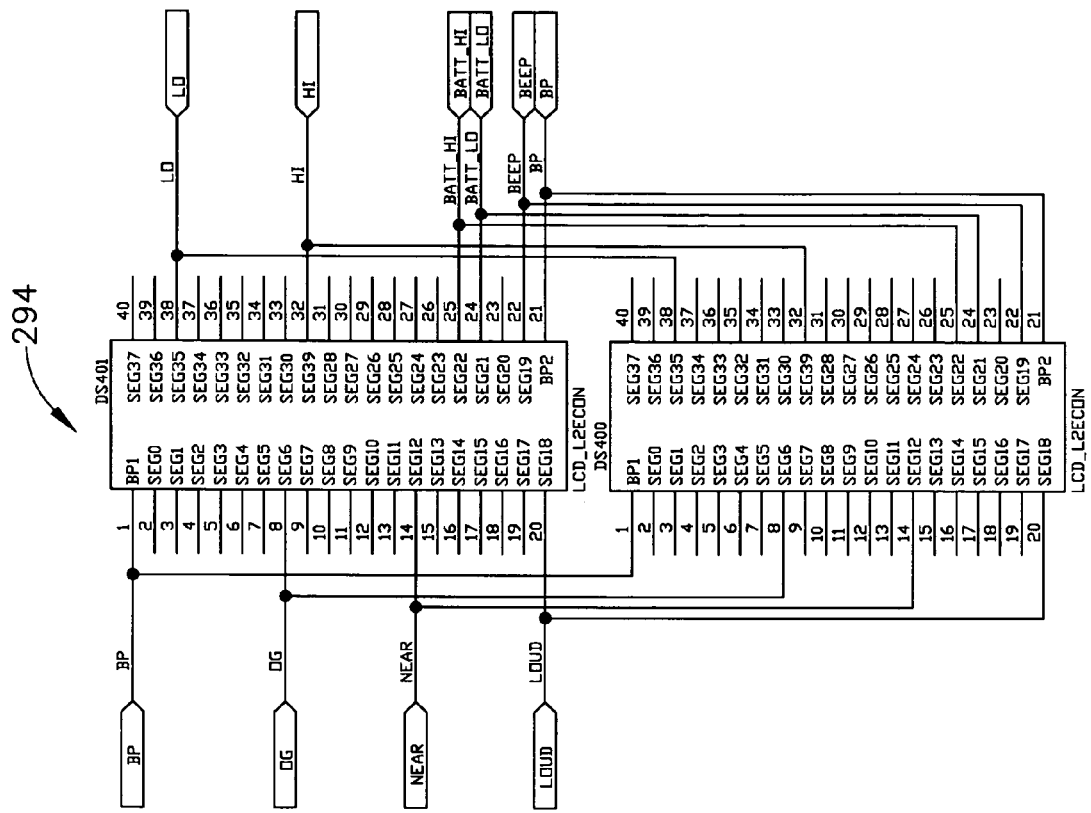
Figure 13:
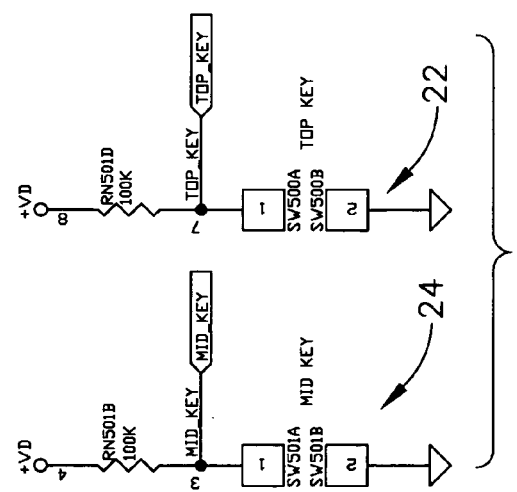

Referring now to FIG. 12, a microprocessor or microcontroller chip 280 is used to not only control the LCD display 30, but also receives many of the control and waveform signals that run throughout the electronic circuit of the detector 10. For example, the output signals 350 and 352 from the synchronous rectifiers 240 and 250 are referred to as "DC1" and "DC2" for the two channels. These signals can be directly fed to the microcontroller 280, which has an on-board analog-to-digital (A/D) converter that can measure the magnitudes of these two input signals. In this manner, the software that executes on the microcontroller 280 will be used to determine the relative strengths (i.e., voltage magnitudes) of these two input signals from channel 1 and channel 2.

As an alternative embodiment, the signals 340 and 342 (signals AC1 and AC2) from the AGC amplifiers 222 and 232 (on FIG. 9) can be configured to be directed to the same inputs on the microcontroller 280, instead of above-noted signals 350 and 352 (signals DC1 and DC2). In this alternative embodiment, the synchronous rectifiers 240 and 250 (on FIG. 11) would not be used, and the phase locked loop circuitry of FIG. 10 would not be used. Instead, a different type of waveform signal strength detector would be used, as discussed below in reference to FIGS. 20 and 21.

Microcontroller 280 also has digital inputs, and these include inputs from the three pushbutton switches on the array of switches 20 on the front panel of the modulated laser detector 10. Other inputs include a "TOP KEY" input from the front panel "top" pushbutton switch 22, and a "MID KEY" input from the front panel "middle" pushbutton switch 24. Microcontroller 280 also controls the "gain" outputs that in turn control the firing gates of the integrated circuits 224 and 234 (see FIG. 6), which respectively control the automatic gain amplifiers 222 and 232 that are illustrated on FIG. 9.

In addition to the above, microcontroller 280 also controls the appearance of the liquid crystal display 294, and it does so by sending control signals to an LCD driver chip, which is an integrated circuit generally designated by the reference numeral 290. The liquid crystal display 294 itself is shown schematically on FIG. 14. In addition, a "back plane" square wave signal drives the LCD display. Furthermore, a "Beep Drive" signal drives a D flip-flop 284, which generates a pair of double-ended signals to drive an audio beeper device, e.g., a piezoelectric element.

If the PIC18F242-I/SO(28) microprocessor/microcontroller chip is used, as illustrated on FIG. 12, then a programming port function can be provided. On FIG. 12, the pin-outs at 296 represent a programming port connector ("J500"), which can be interfaced with a programmer that can allow the system designer, or later a user, to enter upgrades to the system software if desired. A crystal clock oscillator circuit 282 is used with this style of microcontroller chip 280, in the illustrated embodiment.

Figure 15:
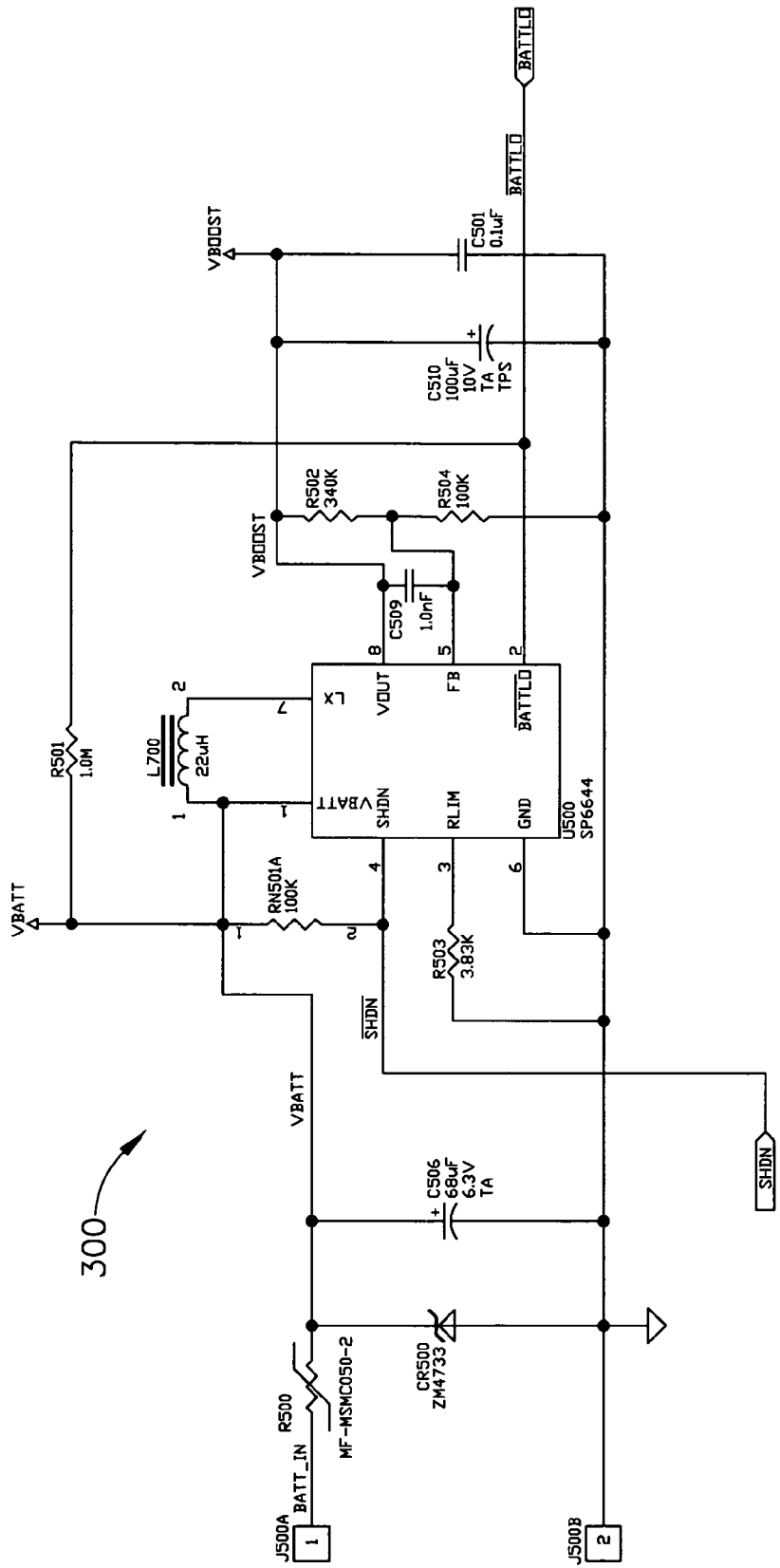
Figure 16:
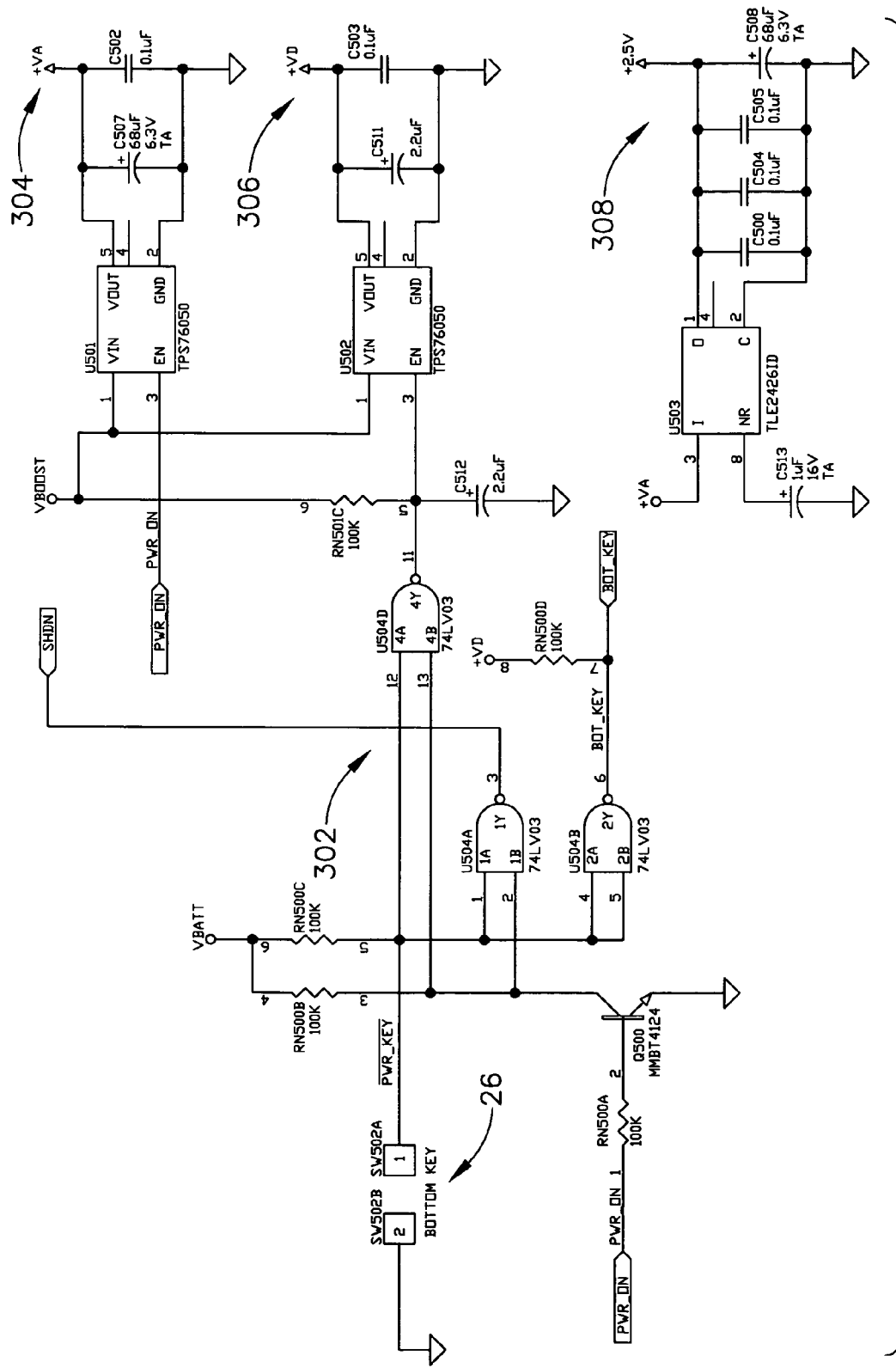

FIG. 15 illustrates some of the power supply circuit components, in which the first portion of the power supply is generally designated by the reference numeral 300. This portion of the power supply 300 boosts the battery voltage from about 3 volts DC up to a regulated value of about +5.5 volts DC. The power supply control circuit is illustrated on FIG. 16, and is generally designated by the reference numeral 302. The boost regulator 300 is designed to continue operating as the batteries begin to run down, even as low as 1 volt (instead of the nominal 3 volts). The power supply control circuit 302 is initiated by the ON-OFF pushbutton key 26, and is controlled by a PWR-ON signal from the microcontroller chip 280. There are multiple voltage regulator integrated circuits as part of the power supply, including regulators that provide an analog voltage source +VA (at reference numeral 304) and also a separate digital power supply rail +VD, as illustrated at the reference numeral 306. There is also a +2.5 VDC power supply rail at 308.

Figure 17:
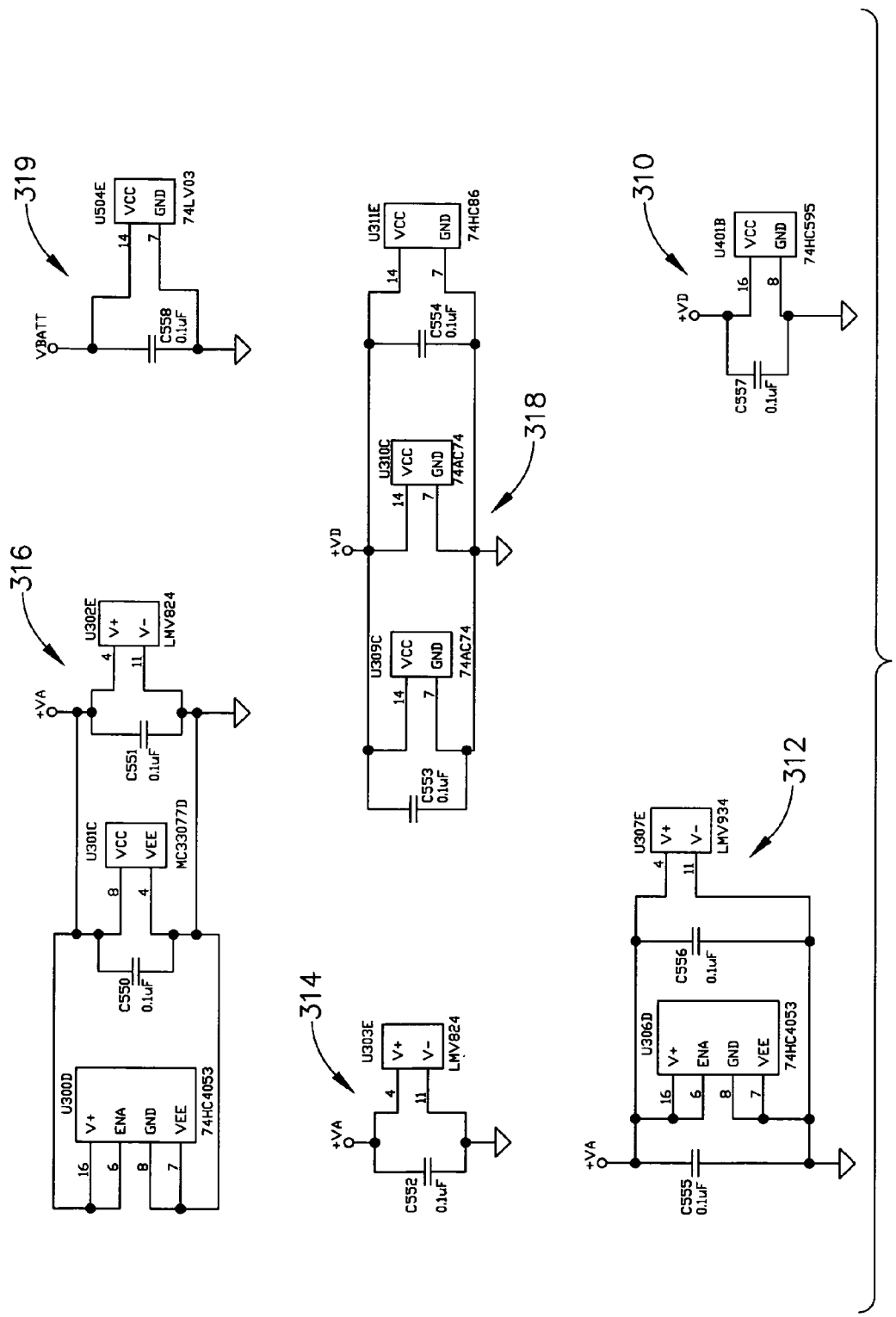
Figure 18:
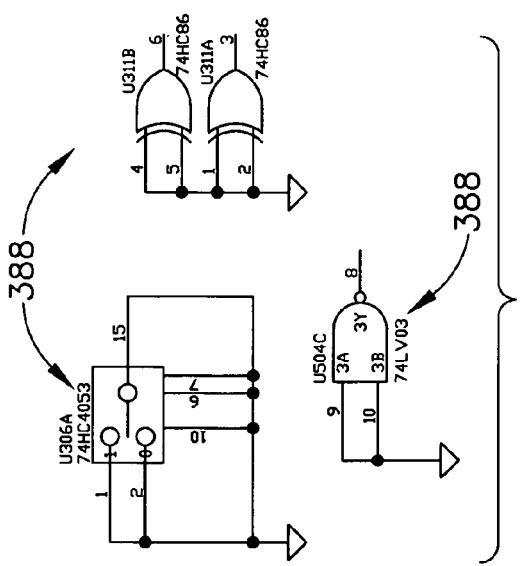

FIG. 17 shows several of the other power supply components, including power supply components 310, 312, 314, 316, 318, and 319. FIG. 18 illustrates a number of unused gates 388 that are part of the integrated circuits used in the electronic control circuit of the laser detector 10. Of course, these "extra" components could be available for other functions, if desired.

By use of the mixer along with an output filter that acts similar to an IF stage, the present invention improves the signal-to-noise ratio considerably. The low pass filter of FIG. 7 has a corner frequency of 400 Hz on either side of the carrier wave frequency, which would be a total noise bandwidth of 800 Hz. This would be much narrower than a modulated laser light receiver that, for example, had a noise bandwidth of 12 kHz, in the range of 4 kHz through 16 kHz.

In the present invention, the signal power is halved by using a combination of the mixers 60, 70 and the low pass filters 220, 230, which filter out the higher frequency component at 16.2 kHz in the example discussed above for the illustrated embodiment. (In this example, the modulation frequency of the laser light transmitter was 8.2 kHz, and the "local-OSC" signal that drives the mixer was 8.0 kHz.) With the signal power halved, then the signal level is lowered by the square root of two.

The noise level of the present invention as compared to a laser light receiver with the 12 kHz noise bandwidth characteristic is reduced by a factor of fifteen, which is the result of dividing 12 kHz by 800 Hz. Therefore, the noise power is reduced by the square root of fifteen, and the signal-to-noise ratio is improved by the square root of fifteen divided by the square root of two, which equals 2.74. This improves the distance that the laser receiver of the present invention can receive a relatively weak modulated signal by that factor of 2.74. In addition, the op-amps used in the present invention can be purchased having a lower gain bandwidth specification, since the output signal from the mixer is 200 Hz, rather than a much higher frequency.

In general, the present invention receives the laser light through a set of photosensors, which convert the light to an electrical signal. This signal is run through a tuned bandpass filter, which can include a low noise op-amp to improve the overall performance of the system. The output of this device is sent to the mixer and then through a filter that acts similar to an IF stage. In the present invention this filter can be a low pass filter, although a typical IF stage would use a bandpass filter. The signal is then run through a high gain amplifier, which in the present invention uses automatic gain control for improved performance. Finally, the signal is directed to a phase locked loop and also to a microcontroller or microprocessor. Part of the phase locked loop circuit uses a synchronous rectifier circuit for improved performance.

The above recitation of the circuit elements is just one embodiment of the present invention. As noted above, the present invention uses an amplifier system that is similar to a superheterodyne receiver. Certainly a classical superheterodyne amplifier could be used, in which the output from the mixer is directed through a bandpass filter rather than a low pass filter.

Figure 19:
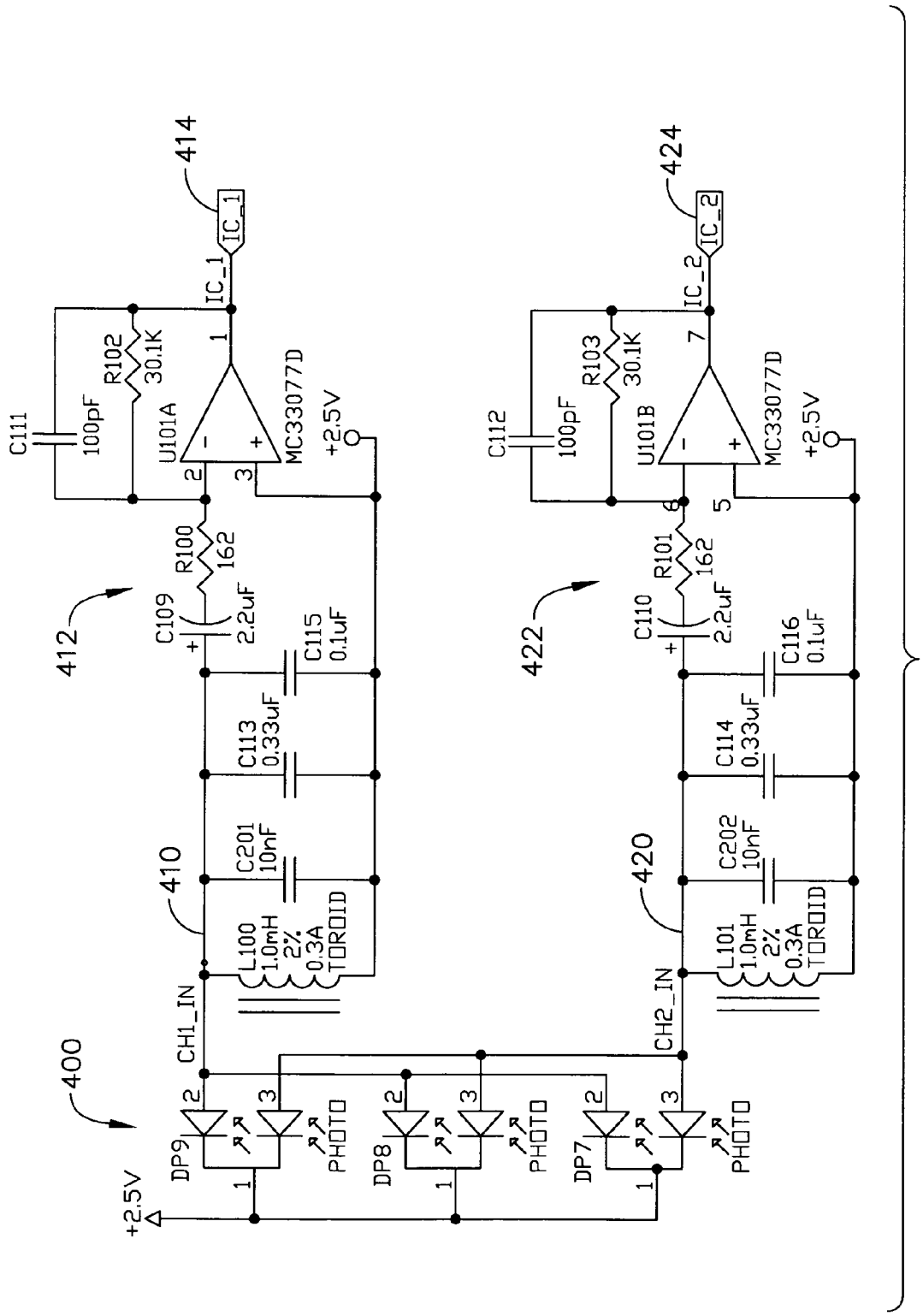
FIG. 19 is an electrical schematic of an alternative embodiment input stage, usable in the present invention, which uses a set of silicon substrates for the photodiodes that electrically form a single split-cell for a proportional modulated beam laser detector, as according to the principles of the present invention.

An alternative embodiment for the input circuit is illustrated as an electrical schematic on FIG. 19. This input circuit is generally designated by the reference numeral 400, and includes a set of photodiodes that comprise a photodetector array, such as the array 150 illustrated on FIG. 2. The photodetector array 400 operates as a proportional modulated beam detector front-end, and electrically will look like three silicon substrates that form a single optical split-cell. The output voltages are at 410 and 420, which are respectively referred to on FIG. 19 as CH_1-IN and CH_2-IN. After running through a band pass filter (either 412 or 422), these channel 1 and channel 2 signals 414 and 424 would become the signals that are input to the mixers 60 and 70, seen on FIGS. 7 and 8 which otherwise would be output from the low noise amplifiers 216 and 218. Once signals 414 and 424 reach this point on the schematic diagram of FIG. 18, they are passed on to circuit components that have been described above, such as the low pass filters with gain amplifiers 220 and 230, respectively.

Figure 20:
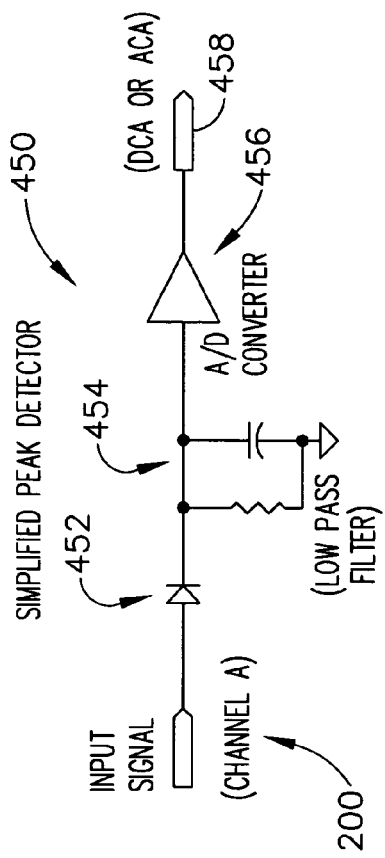
FIG. 20 is an electrical schematic of a simplified peak signal detector, usable in the present invention.

Referring now to FIG. 20, an alternative level detection circuit 450 is illustrated as an example of a simplified peak signal detector. For example, an input signal could arrive from a "Channel A" at 200 on FIG. 20 and then be directed through a diode 452, and then through a low pass filter 454. The signal would now be a substantially DC voltage level, which is then directed to an analog-to-digital converter 456. The output of this A/D converter 456 can then be directed to a microprocessor (or microcontroller), in which the ADC 456 output signal is at 458.

This type of peak detector circuit 450 could be used instead of the phase locked loop, phase comparator circuit, and other circuitry found on FIGS. 10 and 11 that were described above, which essentially comprise an averaging half-wave rectifier circuit. Of course, this simplified peak detector would likely have lower sensitivity, but it nevertheless could be used in certain applications.

Figure 21:
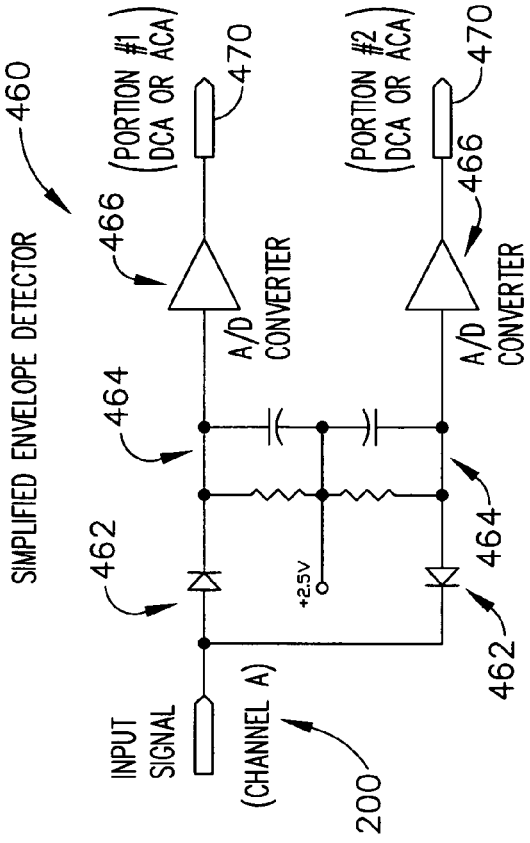
FIG. 21 is an electrical schematic of a simplified envelope signal detector, usable in the present invention.

Another alternative level detection circuit is illustrated in FIG. 21, which depicts a simplified envelope detector 460. An input signal arrives from a "Channel A" at 200, and is then directed through two different diodes 462, and further directed into two different low pass filters 464. These low pass filters are not connected to DC common or ground, but instead are directed to a +2.5 volts DC power supply rail, acting as a virtual ground, assuming the overall power supply rail of this circuit is at +5 volts DC. The two signals thereby produced by the low pass filters 464 will essentially be DC voltage level signals, and which would then be run into two separate analog-to-digital converters 466. The outputs of these two A/D converters are directed as signals at 470 to a microprocessor (or microcontroller) circuit, much like that described above in reference to FIG. 12.

This simplified envelope detector could also replace the phase locked loop, a phase comparator circuit, and other circuit elements found on FIGS. 10 and 11, as discussed above. As with the simplified peak detector of FIG. 20, the simplified envelope detector 460 would likely have less sensitivity than the embodiment described above that uses the phase locked loop circuit, but nevertheless could be used in certain applications.

It will be understood that the logical operations involving the automatic gain control circuits 222 and 232, the level detection functions, and the phase error detection functions that are performed by the microcontroller 280 could be implemented using sequential logic (e.g., using microprocessor or microcomputer technology), or using a logic state machine, or perhaps by discrete logic alone; it could also be implemented using parallel processors. One possible embodiment may use a microprocessor or microcontroller to execute software instructions that are stored in memory cells within an ASIC (an Application Specific Integrated Circuit). In fact, the entire microcontroller 280, along with RAM and executable ROM, may be contained within a single ASIC, in one mode of the present invention. Of course, other types of circuitry could be used to implement the logical operations and analog circuit functions depicted in the drawings without departing from the principles of the present invention.

It will be further understood that the precise circuits depicted in the schematic diagrams of FIGS. 6-21, and discussed above, could be modified to perform similar, although not exact, functions and mathematical operations without departing from the principles of the present invention. The exact nature of some of the circuit elements and logical operations of these circuit elements in FIGS. 6-21 are directed toward specific future models of modulated laser light detectors (those involving Apache Technologies, Inc. laser detectors, for example) and certainly similar, but somewhat different, steps would be taken for use with other types of laser detectors in many instances, with the overall inventive results being the same.

Figure 22:
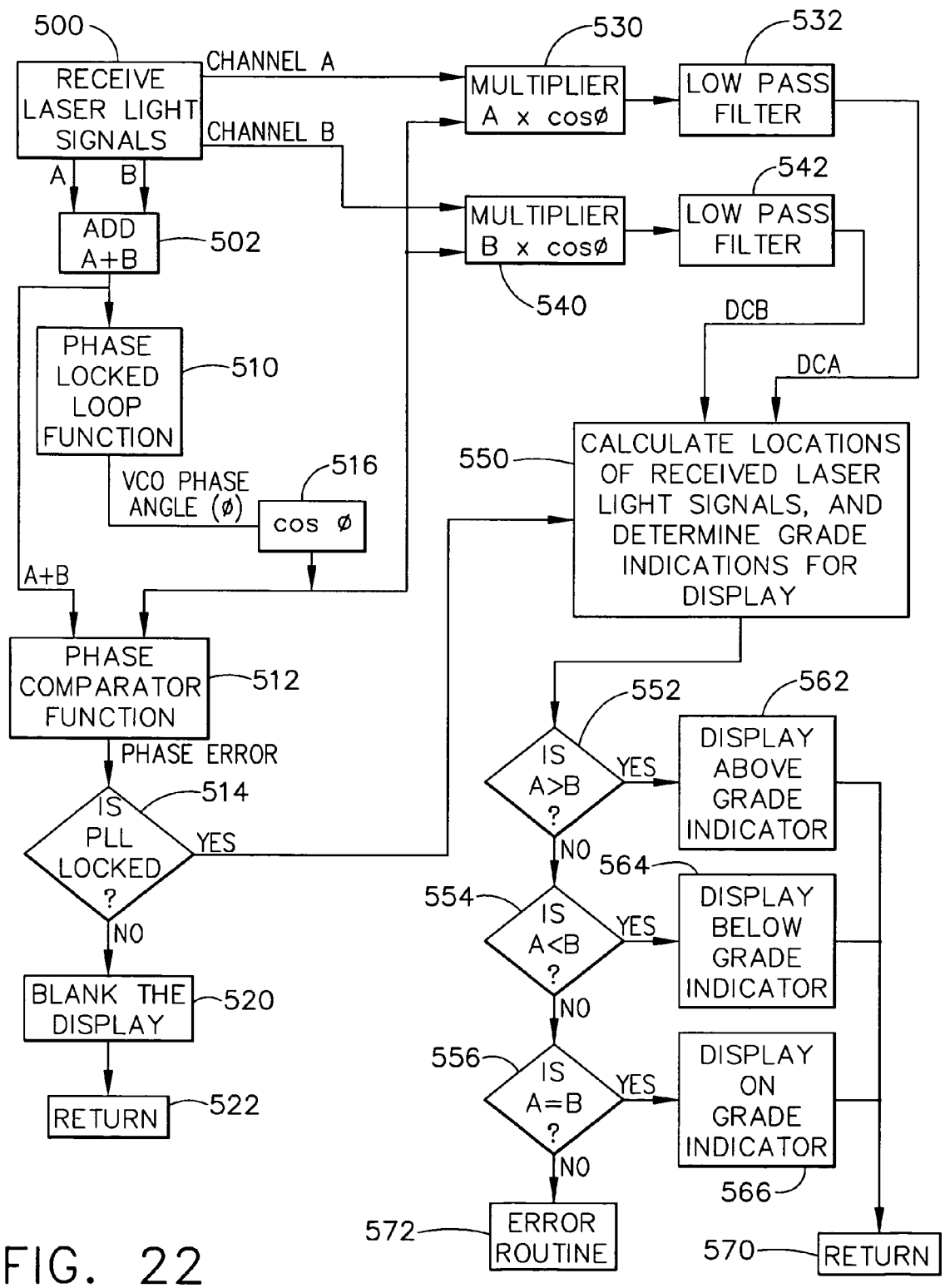
FIG. 22 is a flow chart that depicts some of the important logical steps for a first "software implementation" of the present invention, using a software "phase locked loop" algorithm.

The present invention could also be implemented mainly in software, while using a minimum of hardware circuit components. Of course, some type of photosensor would be required, such as a photodiode array (e.g., the array 50 of FIG. 6). However, some of the circuit elements such as a phase locked loop could be implemented in software, rather than in hardware. FIG. 22 illustrates a flow chart that shows some of the important logical steps involved in such a "software" implementation of the present invention.

Referring now to FIG. 22, beginning at a step 500 the laser light signals are received. These signals are split into two different channels, and in this flow chart these channels will be referred to as "Channel A" and "Channel B." These Channel A and Channel B signals represent digital numbers in this flow chart of FIG. 22, in which these digital numbers represent the signal strength or "level" of the received laser light signals for these two different channels.

The two numeric values of Channel A and Channel B are added together at a step 502, and the summed result is directed to a phase locked loop function 510. The output of phase locked loop function 510 is a "VCO" phase angle (referred to herein as angle $\phi$), which is then directed to a cosine function at a step 516, which takes the cosine of $\theta$ (cos $\theta$). The summed result of Channels A and B is also directed to a phase comparator function 512, as is the cosine of VCO phase angle value from the phase locked loop function 510 and the cost function at step 516. The phase comparator function 512 determines the present phase error, and this value is directed to a decision block 514 which determines whether or not the phase locked loop function is currently in a "locked" state.

If the phase locked loop is not currently locked, then the logic flow travels out the NO result to a step 520 which blanks the display, and then the logic flow is directed to a "return" step 522. That is the end of this routine for the time being. The routine will then be repeated in a periodic manner, or it could be interrupt driven. On the other hand, if the result from the decision step 514 was YES, then further computations are performed and the display will not be blanked.

The signals that represent the values of Channel A and Channel B are also directed to a pair of multiplier functions. Channel A is directed to a step 530 that also receives the cosine of the VCO phase angle (cos $\theta$) via step 516. Therefore, this step 530 receives both the Channel A value and the cos $\phi$ value, multiplies those two numbers together, and directs the result to a low pass filter function at a step 532.

In a similar fashion, Channel B is directed to a multiplier step 540 which also receives the cos $\theta$ value from step 516. Step 540 multiples Channel B times cos $\phi$, and directs the result to a low pass filter function at a step 542.

The outputs from the two low pass filter functions at steps 532 and 542 are designated as "DCA" and "DCB." These two values are directed to a step 550 which calculates the locations of the received laser light signals impacting the photosensors, and then determines the appropriate grade indications that should be displayed. As part of these calculations, the flow chart of FIG. 22 will provide certain details, as discussed below.

The determination of grade includes a decision step 552 that determines whether Channel A is greater than Channel B. If the result is YES, then a step 562 will display the "ABOVE GRADE" indicator on the display. If the result is NO at decision step 552, then the logic flow is directed to another decision step 554. In step 554, it is determined if Channel A is less than Channel B. If the answer is YES, then a step 564 will display the "BELOW GRADE" indicator. If the result is NO at step 554, then the logic flow is directed to another decision step 556.

At decision step 556, it is determined if Channel A is equal to Channel B. If the answer is YES, then a step 566 will display the "ON GRADE" indicator. After any of the display functions have been performed (i.e., functions 562, 564, or 566), then the logic flow is directed to a "Return" function at a step 570, and that is the end of this routine for now.

On the other hand, if the result at decision step 556 is NO, then the logic flow is directed to an Error routine at a step 572. In theory, this would never occur, because one of the grade indicators should always be invoked if the phase locked loop is locked and the display is not blanked. The prerequisites for such a state would normally mean that the laser light is impacting at least one of the photodiodes in the photosensor array, and therefore the detection system should always be able to determine whether or not the receiver is physically positioned above grade, below grade, or on grade. The error routine 572 would be provided only as a fall back position for a comprehensive computer program.

In an alternative form of the present invention that also is implemented mainly in software, the signal strength detector used in finding the laser beam detector position impacting on the array of photosensitive elements can be implemented in a different type of software algorithm. In FIG. 22, a software phase locked loop algorithm was discussed, and can be used for finding the beam position of the laser light striking the photodiode array, such as the array 50 of FIG. 1. The software phase locked loop algorithm requires a significant amount of processing power for the embedded microprocessor of the detection circuit, such as the microprocessor unit 280 depicted on FIG. 12. A different algorithm could be used that uses less processing power, and is now described below in conjunction with the flow chart of FIG. 23.

This second embodiment of a software algorithm for finding the beam position on the photodiode array uses a root mean square (RMS) calculation for determining the effective magnitude of the laser light striking one or more of the photodiode array elements, rather than using the phase locked loop algorithm that was described in reference to FIG. 22. This second embodiment RMS calculation is less processor time intensive, and thus a microprocessor of less capability could be used for this embodiment, if desired.

Since the frequency of modulation of the laser light source, and the local frequency reference of the laser detection device are both known, and they are controlled to a very high degree of accuracy, this RMS algorithm can be implemented in the form discussed below. In the present invention, the knowledge of these parameters allows the embedded microprocessor in the laser detector to sample the signal that is output from the IF stages of the laser detector circuit, in which the IF stages are discussed above as circuits 220 and 230, depicted on FIGS. 7 and 8, respectively. In general, the present invention uses a sampling rate that is an integer multiple of the IF frequency. By use of this arrangement, the required amount of processing power can be minimized when performing the function of determining the received signal magnitude of each channel of the laser detector.

In an exemplary embodiment, the RMS calculation uses a sampling rate of sixteen (16) times the IF frequency, and performs sampling over a sampling time interval that is equivalent to a total of four (4) cycles of the IF signal period. This is done for each channel of the IF signal, as described below in the flow chart of FIG. 23. For each sample, the square of the sample value is calculated and is added to a "sum value." When all sixty-four (64) samples have been taken, then squared and summed, the resulting "sum value" is divided by sixty-four, and the square root is taken of the result. This final value is used as the "steady state" signal magnitude for the channel that has been sampled during that particular sampling time interval. The RMS algorithm of the present invention is thus used to determine the effective magnitude of an AC signal, and outputs that effective magnitude in terms of an equivalent DC signal magnitude. This equivalent DC value is then used in the beam position calculations that take place in the laser detector unit.

It will be understood that the exact number of cycles or periods of the IF frequency that are sampled can be chosen by the system designer, and the number of samples taken per period can also be chosen by the system designer; different values could be used besides those discussed in this exemplary embodiment, all without departing from the principles of the present invention. Moreover, samples of the laser light signals could be taken at multiples of the laser modulation frequency instead of the IF frequency, if desired. This would, however, require much faster processing because the laser modulation frequency typically will be much higher than the IF frequency, at least in the general case for the present invention. However, the type of signal processing that uses the RMS calculation for these samples would work at both the laser modulation frequency or the IF frequency, or essentially for any multiple or division thereof, so long as the appropriate number of samples was taken per period of the modulation frequency or the IF frequency, or one of their harmonics or divisions.

Figure 23:
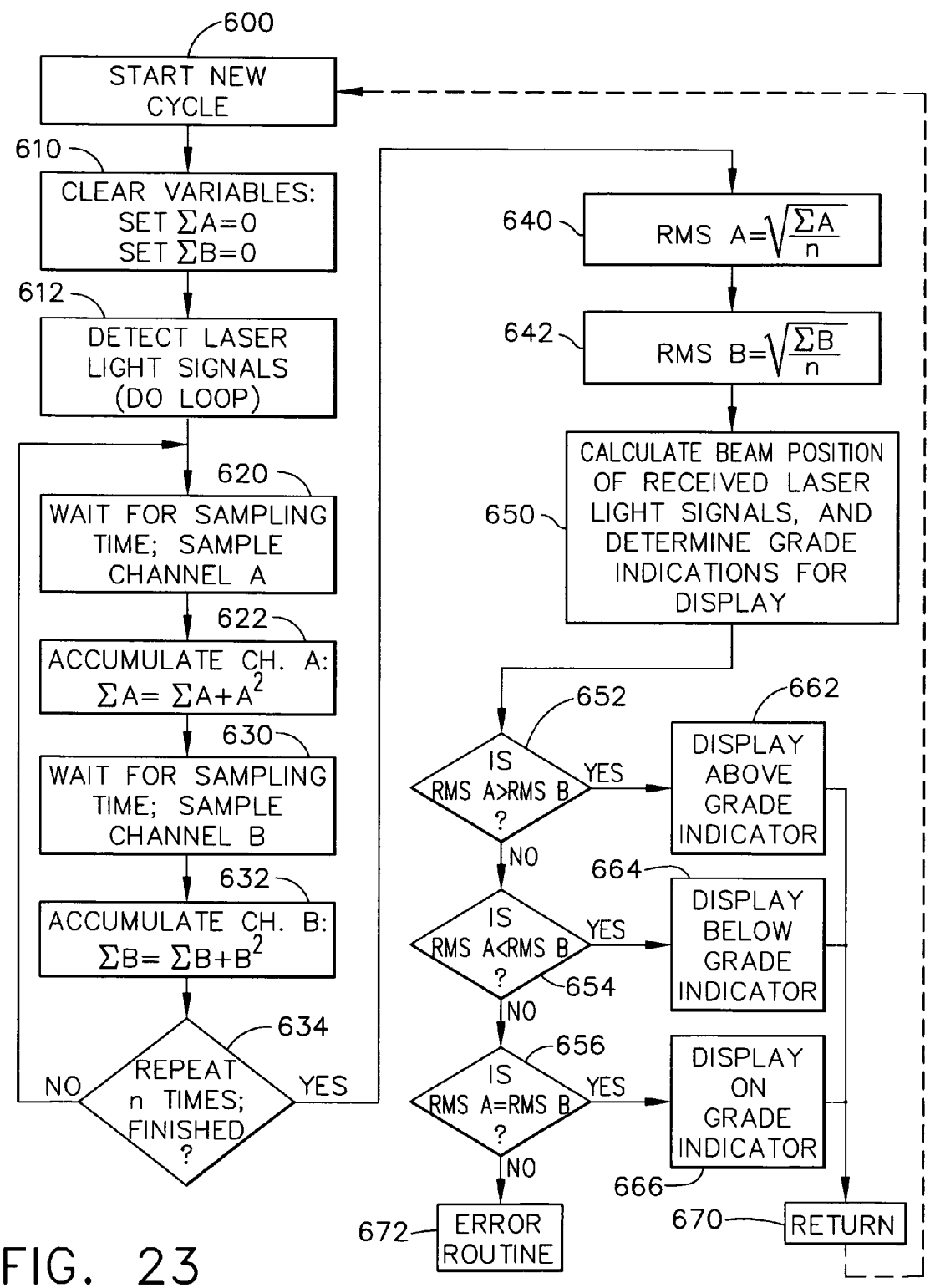
FIG. 23 is a flow chart that depicts some of the important logical steps for a second "software implementation" of the present invention, using an RMS calculation to determine an effective DC value of the AC signals running at the IF frequency.

Referring now to FIG. 23, beginning at a step 600 the laser light signals are received by the detector unit. These signals are split into two different channels, and in this flow chart those channels will be referred to as "Channel A" and "Channel B." These Channel A and Channel B signals represent digital numbers in the flow chart of FIG. 23, in which these digital numbers are related to the signal strength or "level" of the received laser light signals for these two different channels.

At a step 610, two buffers or memory locations are cleared for variables that will sum (or accumulate) the values for both Channel A and Channel B. On the flow chart, the variable for Channel A's summation (or accumulation) is referred to as $\Sigma A$, and the summation (or accumulation) value for Channel B signals is referred to as $\Sigma B$. These summation variables should be cleared at the beginning of each sampling time interval for the Channel A and Channel B laser light signals in this flow chart.

The next step 612 detects the laser light signals in a "do loop," in which the laser light signals are sampled multiple times for each channel. In this example, the channels are both sampled sixteen (16) times for a single period of the IF frequency. In addition, these sixteen (16) samples per period are to occur for four (4) continuous periods, which then provides a total of sixty-four (64) samples for each of Channel A and Channel B signals over the entire sampling time interval. (As noted above, the number of samples per IF period, or the number of IF frequency periods in the sampling interval could be changed without departing from the principles of the present invention.)

A step 620 now waits for the proper time to take a sample of the signals. At step 620, the Channel A signal is sampled at the appropriate time. The next step is at 622, in which this sample of Channel A is "accumulated" into the summation variable for the Channel A signals, which is the $\Sigma A$ variable. To accumulate the $\Sigma A$ variable, the value of Channel A is first squared, and that value is added into the $\Sigma A$ accumulation (or summation) variable. In this first pass since clearing the $\Sigma A$ variable, the end result of the accumulation (or addition) step is the first sampled value for Channel A, which is A2.

A step 630 now waits for the appropriate time to take a sample of the Channel B signal. After that occurs, a step 632 accumulates the Channel B signal values using a similar equation to that found in step 622 for Channel A. In step 632, the Channel B signal is first squared, and then added to the previous value that has been accumulated, which is the variable ΣB. In this first pass (since clearing the ΣB variable at step 610), the end result of this accumulation step 632 will be the first sample value for Channel B signal squared, or B2.

A decision step 634 now determines whether or not the flow chart is finished with the sampling steps. In step 634, the number of samples is referred to by the variable "n" which can be any integer number, but as discussed above is equal to a value of sixty-four (64), in this example. Therefore, the "do loop" steps of 620, 622, 630, and 632 will be repeated sixty-four (64) times. If the logic flow has not finished repeating these steps sixty-four (64) times yet, then the result of this decision step 634 is NO. When that occurs, the logic flow is directed back to step 620, where the next samples are taken for both Channels A and B. On the other hand, if this logic flow has been repeated the correct total number of times (i.e., sixty-four times), then the result at step 634 is YES, and the logic flow is directed to a step 640.

Step 640 determines the root mean square value for Channel A. This is calculated by taking the summation of the Channel A values, ΣA, and dividing it by n, which is the value sixty-four (64) in this example. Once a square root of that is taken, the root mean square (RMS) value for Channel A has been determined.

A step 642 does essentially the same function for Channel B as step 640 did for Channel A. The ΣB variable that has been accumulated over the sixty-four (64) samples is now divided by that number of samples n (which is sixty-four in this example), and the square root of that is taken to provide the output value for the root mean square (RMS) for Channel B.

As noted above, this RMS algorithm is used to determine the effective magnitude of what began as an AC signal (at the IF frequency in this embodiment) and outputs this value in terms of an equivalent DC magnitude. The effective DC value is then used in the beam position calculations, as discussed immediately below. For each channel, the initial samples taken represent instantaneous values of the AC signal's waveform and magnitude, and the "final" value that is output from the routine represents a steady state equivalent magnitude of the AC signal, during the sampling interval.

The determination of grade includes a decision step 652 that determines whether Channel A is greater than Channel B. If the result is YES, then a step 662 will display the "ABOVE GRADE" indicator on the display. If the result is NO at decision step 652, then the logic flow is directed to another decision step 654. In step 654, it is determined if Channel A is less than Channel B. If the answer is YES, then a step 664 will display the "BELOW GRADE" indicator. If the result is NO at step 654, then the logic flow is directed to another decision step 656.

At decision step 656, it is determined if Channel A is equal to Channel B. If the answer is YES, then a step 666 will display the "ON GRADE" indicator. After any of the display functions have been performed (i.e., functions 662, 664, or 666), then the logic flow is directed to a "Return" function at a step 670, and that is the end of this routine for now.

On the other hand, if the result at decision step 656 is NO, then the logic flow is directed to an Error routine at a step 672. In theory, this would never occur, because one of the grade indicators should always be invoked if the phase locked loop is locked and the display is not blanked. The prerequisites for such a state would normally mean that the laser light is impacting at least one of the photodiodes in the photosensor array, and therefore the detection system should always be able to determine whether or not the receiver is physically positioned above grade, below grade, or on grade. The error routine 672 would be provided only as a fall back position for a comprehensive computer program.

As noted above, portions of the present invention can be implemented mainly in software while using a minimum of hardware circuit components. In yet another alternative form of the present invention that is implemented mainly in software, the signal strength detector used in finding the laser beam detector position impacting on the array of photosensitive elements can be implemented in a different type of software algorithm. The flow charts of FIGS. 22 and 23 both discussed software algorithms that can be implemented in the embedded microprocessor of the detection circuit, such as the microprocessor unit 280 depicted on FIG. 12. Another different (third) algorithm could be used that uses even less processing power, and is now described below in conjunction with the flow chart of FIG. 24.

This third embodiment of a software algorithm for finding the beam position on the photodiode array uses a Discrete Fourier Transform calculation for determining the effective magnitude of the laser light striking one or more of the photodiode array elements, rather than using the phase locked loop algorithm that was described in reference to FIG. 22, or the RMS calculation that was described in reference to FIG. 23. A microprocessor of less capability could be used for this third embodiment, if desired, even while implementing a more accurate algorithm for converting the incoming laser light signals into a numeric representation of the amplitude of a signal waveform. Using the principles of the present invention, the numeric value representation of the amplitude of the signal waveform can be determined while providing additional noise and out of band frequency rejection, and also requiring less processing power than many other forms of software calculations.

In this embodiment, a Discrete Fourier Transform (DFT) is used to calculate the numeric value representation of the amplitude of the signal waveform of the laser light striking the photodetector units. Although some DFT algorithms are known in the art for other engineering applications, the description below provides a simplified methodology for calculating these values, while not sacrificing accuracy to any significant degree when determining a numeric representation of the amplitude of a laser light signal.

Using the DFT algorithm of the present invention, an arbitrary input signal can be sampled and analyzed for its spectral content in a numeric manner. A time domain signal can be thought of as being composed of a number of sine waves of the proper frequencies, amplitudes, and phases, all summed together. A Fourier transform provides a mathematical means of converting a time domain signal into its component sine waves. When a time domain signal has been sampled with an analog-to-digital converter (ADC), the input signal is considered to be discrete in nature. This is true because any ADC will sample its input signal at a certain time interval, and the output is the instantaneous voltage of the input signal at the instant of sampling. No information is known about the input signal during the time between each sampling instance. While this might appear to be a great limitation, there is a large body of theoretical and practical knowledge in utilizing such discrete signal data streams and is well known in the field.

When using the DFT algorithm of the present invention, the arbitrary waveform is sampled in the time domain and the spectral components of the signal are calculated in the frequency domain. The signal to be sampled is generally periodic in nature when using the present invention, due to the modulation of the laser signal of the laser transmitter. As an example, many laser transmitters use a modulation frequency of 7812.5 Hertz. The laser beam is generally modulated with a square wave having a 50% duty cycle, and by the time the signal passes through the analog signal processing circuits of the laser detector, the signal that is sampled is generally a sinusoid in form. An appropriate form for the DFT equation for a sampled input signal that is periodic in nature is given below, in EQUATION #1:

$$X(mF) = \sum_{n=0}^{N-1} x(nT) e^{-j2\pi mnFT} \quad \text{EQUATION \#1}$$

Where:
X=spectral component in the frequency domain
x=input signal in the time domain
n=input sample number
m=frequency component sample number
T=time increment between successive input signal samples (sampling interval (T=1/fs))
fs=sampling frequency
F=frequency increment between successive spectral components (fundamental frequency of the signal (F=1/tp ))
tp=overall sampling interval time (for 64 samples, for example)
N=number of signal input samples (N=1/FT=fs*tp)

In EQUATION #1, it is assumed that the input signal is sampled over one full cycle of the periodic signal. Since both the laser transmitter and the laser detector employ a crystal oscillator with a very low frequency tolerance, the detector can synchronize its input sampling with the input signal to ensure that the detector sampling interval spans an integer number of input signal cycles. Using Euler's identity, and recognizing that the input sample sequence is real (i.e., no imaginary parts), the above equation can also be expressed below, as EQUATION #2:

$$X(mF) = \sum_{n=0}^{N-1} x(nT)\cos\left(\frac{2\pi mn}{N}\right) - j\sum_{n=0}^{N-1} x(nT)\sin\left(\frac{2\pi mn}{N}\right) \quad \text{EQUATION \#2}$$

In the present invention, the magnitude of the spectral component is the only value of interest, so EQUATION #2 can be further developed as EQUATION #3:

$$|X(mF)| = \sqrt{\left(\sum_{n=0}^{N-1} x(nT)\cos\left(\frac{2\pi mn}{N}\right)\right)^2 + \left(-j\sum_{n=0}^{N-1} x(nT)\sin\left(\frac{2\pi mn}{N}\right)\right)^2} \quad \text{EQUATION \#3}$$

which can simplify to EQUATION #4, below:

$$|X(mF)| = \quad \text{EQUATION \#4}$$

-continued $$\sqrt{\left(\sum_{n=0}^{N-1} x(nT)\cos\left(\frac{2\pi mn}{N}\right)\right)^2 + \left(\sum_{n=0}^{N-1} x(nT)\sin\left(\frac{2\pi mn}{N}\right)\right)^2}$$

When using this DFT technique in the laser receiver application, it is necessary to consider the specific values that can be utilized in a laser receiver/laser transmitter system design. It is understood that the specific values discussed below are for presenting an example, and other values could be utilized without departing from the principles of the present invention.

In this example of the present invention, the value of interest is the magnitude of the laser signal that has a frequency of 7812.5 Hertz. This laser signal is mixed (as described above) with a local oscillator signal having a frequency of 7905.1 Hertz which, after passing through the low pass filter, results in an Intermediate Frequency (IF) signal of 92.6 Hertz, which has a period of approximately 10.8 milliseconds (msec). To reduce the effect of noise on the final calculated result, it is desirable to sample multiple cycles of the input signal. In this example, the IF signal will be sampled for four entire cycles. This means a sampling interval will be approximately 43.2 msec (tp=43.2 msec; F=23.15 Hertz). It was further decided in this example to sample the input signal at exactly sixteen (16) times the IF frequency, or at 1.48 kHz (fs=1.48 kHz; T=675.7 microseconds). The total number of input samples per sampling interval, therefore, is sixty-four (64) samples. In the flow chart of FIG. 24, discussed below, this number of samples is referred to as "n".

Since the magnitude of the fundamental component of the IF signal is the value of significant interest in this invention, the calculation of the entire DFT is not required; instead, merely a single value in the sequence of frequency components (or "DFT series elements") is needed. Also, since the DFT assumes that the sampling interval is one complete cycle of the periodic input waveform, and in this example four complete cycles of the IF input waveform are being acquired, then the spectral component of interest is not the fundamental value (m=1), but instead is the fourth element of the DFT series (m=4).

If the above specific values are substituted into EQUATION #4 and converted to references of the sample number in the sampling interval and spectral component in the spectral series {i.e., X(mF) becomes X(4); and x(nT) becomes x(n)}, the following equation is produced, as EQUATION #5:

$$|X(4)| = \sqrt{\left(\sum_{n=0}^{63} x(n)\cos\left(\frac{\pi n}{8}\right)\right)^2 + \left(\sum_{n=0}^{63} x(n)\sin\left(\frac{\pi n}{8}\right)\right)^2} \quad \text{EQUATION \#5}$$

This equation is much more manageable than a software phase locked loop of a previous invention by the same inventor (see U.S. patent application Ser. No. 11/082,041 filed on Mar. 16, 2005, titled: "MODULATED LASER LIGHT DETECTOR WITH IMPROVED RANGE"). It nevertheless still is a challenge for a small eight-bit microprocessor to perform these calculations in real time. In the above example, a total of 128 trigonometric functions, 130 multiplications, 127 additions, and one square root operation must be performed in real time. For a practical approach, a further simplification is desired.

Such a simplification is possible when recognizing that the sine and cosine functions are repetitive, and in fact repeat four times. As a result, only a maximum of sixteen values are required in the magnitude calculation of EQUATION #5. Consequently, the IF input sample values can be summed into a total of sixteen partial summations, or "bins". Each of these summation bins can be expressed as follows, as EQUATION #6:

$$b(n) = \sum_{s=0}^{3} x(16\,s+n) \text{ where } 0 \le n \le 15 \qquad \text{EQUATION \#6}$$

Where b=a partial summation (or "bin") of the input signal, in the time domain. Substituting this expression into EQUATION #5 yields the following EQUATION #7:

$$|X(4)| = \sqrt{\left(\sum_{n=0}^{15} b(n)\cos\left(\frac{\pi n}{8}\right)\right)^2 + \left(\sum_{n=0}^{15} b(n)\sin\left(\frac{\pi n}{8}\right)\right)^2} \qquad \text{EQUATION \#7}$$

The form of EQUATION #7 requires a total of thirty-two trigonometric functions, 34 multiplications, 31 additions, and one square root operation, which is a significant reduction in computational complexity. Further reductions in complexity can be achieved if one recognizes that many of the sine and cosine functions produce trivial results. In particular, EQUATION #8 below has values that reduce to zero (0):

$$\sin\left(\frac{0\pi}{8}\right) = \sin\left(\frac{8\pi}{8}\right) = \cos\left(\frac{4\pi}{8}\right) = \cos\left(\frac{12\pi}{8}\right) = 0 \qquad \text{EQUATION \#8}$$

and some components reduce to a value of one (1), as in EQUATION #9, below:

$$\sin\left(\frac{4\pi}{8}\right) = -\sin\left(\frac{12\pi}{8}\right) = \cos\left(\frac{0\pi}{8}\right) = -\cos\left(\frac{8\pi}{8}\right) = 1 \qquad \text{EQUATION \#9}$$

If these trivial results are recognized by the software, and redundant calculations are skipped, the DFT calculation is further reduced. The resulting calculation requires 24 trigonometric functions, 26 multiplications, 27 additions, and one square root function.

By recognizing the symmetry of the trigonometric functions, further reductions in computation complexity can be achieved. These symmetries are illustrated in EQUATION #10, #11, and #12, as follows:

$$\sin\left(\frac{\pi}{8}\right) = \sin\left(\frac{7\pi}{8}\right) = -\sin\left(\frac{9\pi}{8}\right) = -\sin\left(\frac{15\pi}{8}\right) = \qquad \text{EQUATION \#10}$$
$$\cos\left(\frac{3\pi}{8}\right) = -\cos\left(\frac{5\pi}{8}\right) = -\cos\left(\frac{11\pi}{8}\right) = \cos\left(\frac{13\pi}{8}\right)$$

$$\sin\left(\frac{2\pi}{8}\right) = \sin\left(\frac{6\pi}{8}\right) = -\sin\left(\frac{10\pi}{8}\right) = -\sin\left(\frac{14\pi}{8}\right) = \qquad \text{EQUATION \#11}$$
$$\cos\left(\frac{2\pi}{8}\right) = -\cos\left(\frac{6\pi}{8}\right) = -\cos\left(\frac{10\pi}{8}\right) = \cos\left(\frac{14\pi}{8}\right)$$

$$\sin\left(\frac{3\pi}{8}\right) = \sin\left(\frac{5\pi}{8}\right) = -\sin\left(\frac{11\pi}{8}\right) = -\sin\left(\frac{13\pi}{8}\right) = \qquad \text{EQUATION \#12}$$
$$\cos\left(\frac{\pi}{8}\right) = -\cos\left(\frac{7\pi}{8}\right) = -\cos\left(\frac{9\pi}{8}\right) = \cos\left(\frac{15\pi}{8}\right)$$

As a result, there are only three basic trigonometric values that are used in the calculations, provided that the sign of each value is manipulated correctly. These few values are easily stored in a Look-Up Table. Consequently, the calculations required to determine the magnitude of the spectral component are now reduced to 26 multiplications, 27 additions, and one square root function.

A final optimization can be achieved by rearranging the order of operations in the summations. Breaking down the magnitude equation into the real and imaginary parts produces the following equations, #13, #14, and #15:

$$|X(4)| = \sqrt{(X_R)^2 + (X_I)^2} \qquad \text{EQUATION \#13}$$

where $$X_R = \sum_{n=0}^{15} b(n)\cos\left(\frac{\pi n}{8}\right) \qquad \text{EQUATION \#14}$$

and $$X_I = \sum_{n=0}^{15} b(n)\sin\left(\frac{\pi n}{8}\right) \qquad \text{EQUATION \#15}$$

By expanding both the real and imaginary parts of the spectral components in EQUATIONS #14 and #15, and taking advantage of the trivial sine and cosine values in EQUATIONS #8 and #9, as well as the symmetrical sine and cosine values as depicted in EQUATIONS #10, #11, and #12, this leads to a final optimization, as follows in EQUATIONS #16 and #17:

$$X_R = b(0) - b(8) + \sin\left(\frac{\pi}{8}\right)(b(3) - b(5) - b(11) + b(13)) + \qquad \text{EQUATION \#16}$$
$$\sin\left(\frac{2\pi}{8}\right)(b(2) - b(6) - b(10) + b(14)) +$$
$$\sin\left(\frac{3\pi}{8}\right)(b(1) - b(7) - b(9) + b(15))$$

$$X_I = b(4) - b(12) + \sin\left(\frac{\pi}{8}\right)(b(1) + b(7) - b(9) - b(15)) + \qquad \text{EQUATION \#17}$$
$$\sin\left(\frac{2\pi}{8}\right)(b(2) + b(6) - b(10) - b(14)) +$$
$$\sin\left(\frac{3\pi}{8}\right)(b(3) + b(5) - b(11) + b(13))$$

While EQUATIONS #16 and #17 appear much more complex, and certainly they are more complex to write, they are in fact much simpler computationally. The total computational requirements are 8 multiplications, 29 additions, and one square root operation. This is a much easier computation for a small microprocessor to perform in real time, and makes the DFT approach of the present invention possible in a low cost and low power product.

Figure 24:
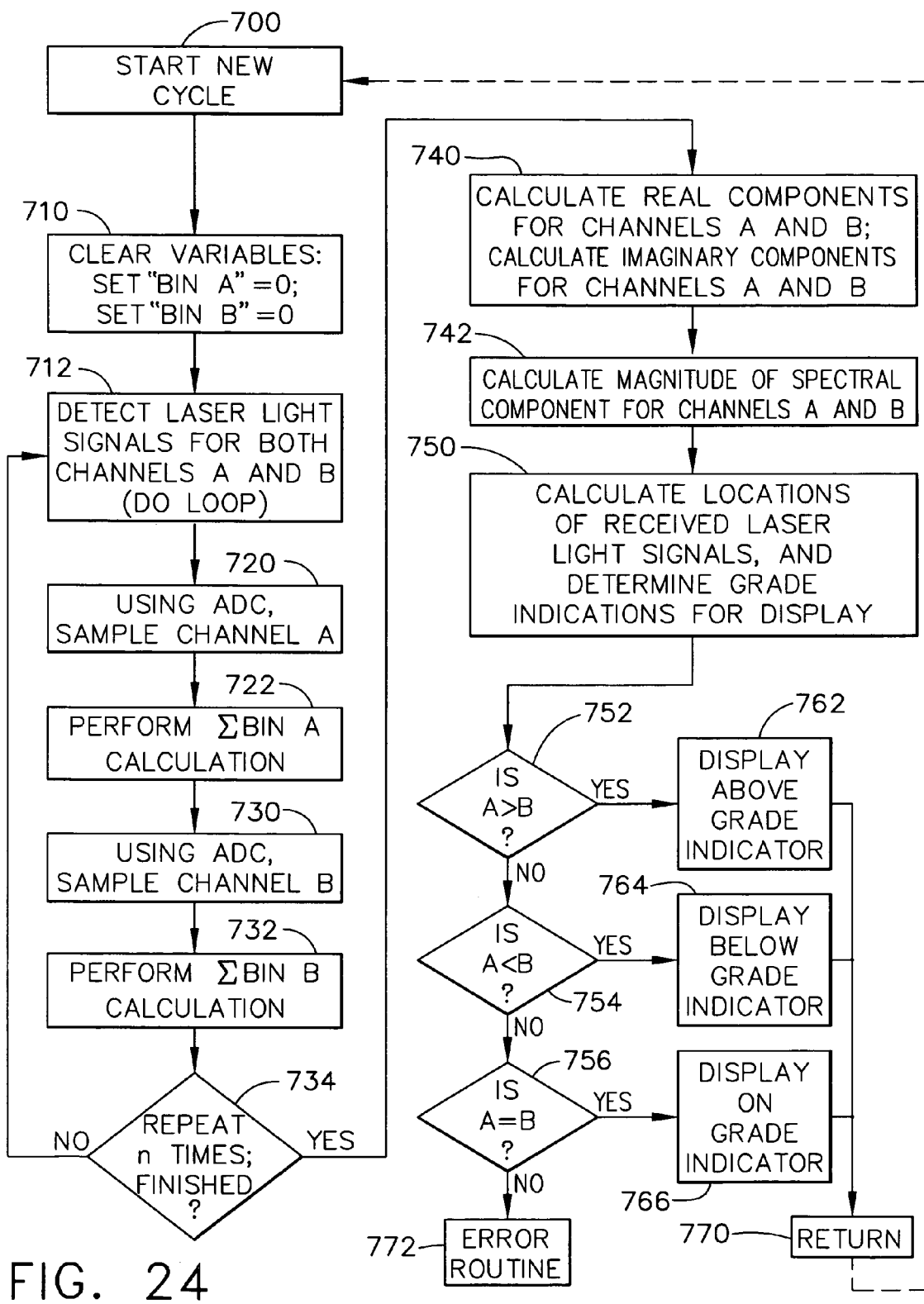
FIG. 24 is a flow chart that depicts some of the important logical steps for a third "software implementation" of the present invention, using a Discrete Fourier Transform calculation to determine a magnitude of the spectral components of the AC signals running at the IF frequency.

Referring now to FIG. 24, a flow chart is provided showing an example of the present invention. Starting at a step 700, a new cycle of calculations begins. The next step clears the variables at a step 710, in which the "BIN A" and "BIN B" values are all set to zero (0). These are the "summation bin" values that may have been calculated for a previous set of input samples, and now must be cleared for the "next" set of input samples.

A step 712 now detects the laser light signals for both Channel A and for Channel B in a series of computation and sampling steps. For Channel A, a step 720 samples Channel A using an analog-to-digital converter (ADC), and its periodically-sampled output signal is directed to a step 722 that performs a summation calculation for BIN A. An example of this BIN A summation calculation is represented above as EQUATION #6.

A similar set of steps 730 and 732 are performed to sample Channel B, again using the analog-to-digital converter (ADC). Step 732 performs the summation of BIN B calculations (referring again to EQUATION #6). A decision step 734 now determines if the detection routine is finished, and determines if it has been repeated n number of times. As described above, for this example samples will be taken sixty-four (64) times for Channel A, and sixty-four (64) times for Channel B.

When both channels have been sampled and their appropriate "BINS" filled with the proper number of calculations, the logic flow is directed to a step 740 that calculates the real components for both Channels A and B, and also calculates the imaginary components for both Channels A and B. Exemplary equations for doing this are EQUATIONS #16 and #17, presented above.

The logic flow now travels to a step 742 that calculates the magnitude of the spectral component for Channels A and B. An exemplary equation for doing this is EQUATION #13, presented above. These two magnitudes (for A and B) are now directed to a step 750 which calculates the locations of the received laser light signals impacting the photosensors, and then determines the appropriate grade indications that should be displayed.

The determination of grade includes a decision step 752 that determines whether Channel A is greater than Channel B. If the result is YES, then a step 762 will display the "ABOVE GRADE" indicator on the display. If the result is NO at decision step 752, then the logic flow is directed to another decision step 754. In step 754, it is determined if Channel A is less than Channel B. If the answer is YES, then a step 764 will display the "BELOW GRADE" indicator. If the result is NO at step 754, then the logic flow is directed to another decision step 756.

At decision step 756, it is determined if Channel A is equal to Channel B. If the answer is YES, then a step 766 will display the "ON GRADE" indicator. After any of the display functions have been performed (i.e., functions 762, 764, or 766), then the logic flow is directed to a "Return" function at a step 770, and that is the end of this routine for now.

On the other hand, if the result at decision step 756 is NO, then the logic flow is directed to an Error routine at a step 772. In theory, this would never occur, because one of the grade indicators should always be invoked if the display is not blanked. The prerequisites for such a state would normally mean that the laser light is impacting at least one of the photodiodes in the photosensor array, and therefore the detection system should always be able to determine whether or not the receiver is physically positioned above grade, below grade, or on grade. The error routine 772 would be provided only as a fall back position for a comprehensive computer program.

It should be noted that the sampling for both Channels A and B should be performed together in real time so that both channels take their samples while receiving the same modulated laser light strike on the photodetector elements. Two separate analog-to-digital converters (ADCs) could be used to capture the samples virtually simultaneously, although that is not necessary. Instead, the samples could be interleaved, such that Channel A is first sampled, then Channel B, then back to Channel A, then Channel B, and so on, all using a single ADC device.

While two parallel processors could be used with two ADCs to speed up the sampling and calculating processes, this should not be necessary for most commercial applications when using the present invention, particularly since one of the goals of the present invention is to provide a simpler computation to acquire the necessary information. Certainly the BIN A summation and BIN B summation calculations of steps 722 and 732 could be performed sequentially, once the actual samples have been gathered for both Channel A and Channel B at steps 720 and 730.

It will be understood that the present invention generally has been described herein as being used to detect modulated "laser" light. However, other forms of modulated light energy can also be detected by using the principles of the present invention. Various forms of modulated electromagnetic energy can be detected by various types of photosensors, and the present invention can often be used to detect such modulated energy transmissions regardless as to whether or not the energy is in the form of a laser beam. For example, "regular" (non-laser) light emitting diodes (LEDs) could be used to generate modulated light signals, which certainly could be detected by the present invention. Moreover, non-visible light wavelengths also can be detected by the present invention, so long as the proper photosensors are employed.

It will also be understood that the logical operations described in relation to the flow charts of FIGS. 22, 23, and 24 can be implemented using sequential logic, such as by using microprocessor technology, or using a logic state machine, or perhaps by discrete logic; it even could be implemented using parallel processors. One preferred embodiment may use a microprocessor or microcontroller (e.g., microcontroller 280) to execute software instructions that are stored in memory cells within an ASIC. In fact, the entire microcontroller 280 along with RAM and executable ROM may be contained within a single ASIC, in one mode of the present invention. Of course, other types of circuitry could be used to implement these logical operations depicted in the drawings without departing from the principles of the present invention.

It will be further understood that the precise logical operations depicted in the flow charts of FIGS. 22-24, and discussed above, could be somewhat modified to perform similar, although not exact, functions without departing from the principles of the present invention. The exact nature of some of the decision steps and other commands in these flow charts are directed toward specific future models of modulated laser light detectors (e.g., those manufactured by Apache Technologies, Inc.) and certainly similar, but somewhat different, steps would be taken for use with other brands of modulated laser light detectors in many instances, with the overall inventive results being the same.

An earlier patent application assigned to Apache Technologies, Inc. discusses another laser light detector that detects modulated laser light. This other application is titled "MODULATED LASER LIGHT DETECTOR," and was filed on Oct. 29, 2003 under Ser. No. 10/695,673; and is incorporated herein by reference in its entirety.

All documents cited in the Detailed Description of the Invention are, in relevant part, incorporated herein by reference; the citation of any document is not to be construed as an admission that it is prior art with respect to the present invention.

The foregoing description of a preferred embodiment of the invention has been presented for purposes of illustration and description. It is not intended to be exhaustive or to limit the invention to the precise form disclosed. Any examples described or illustrated herein are intended as non-limiting examples, and many modifications or variations of the examples, or of the preferred embodiment(s), are possible in light of the above teachings, without departing from the spirit and scope of the present invention. The embodiment(s) was chosen and described in order to illustrate the principles of the invention and its practical application to thereby enable one of ordinary skill in the art to utilize the invention in various embodiments and with various modifications as are suited to particular uses contemplated. It is intended to cover in the appended claims all such changes and modifications that are within the scope of this invention.

The invention claimed is:

1. A method for detecting a modulated light beam, said method comprising:
   (a) receiving an electromagnetic laser signal having at least one predetermined range of wavelengths and at least one predetermined first modulation frequency, and converting said electromagnetic laser signal into a first electrical signal;
   (b) converting said first electrical signal from said at least one predetermined first modulation frequency to a second signal having at least one predetermined second, different frequency that is related to said at least one predetermined first modulation frequency;
   (c) sampling, over a sampling time interval, said second signal at a rate that is an integer multiple of said at least one second frequency, and determining a substantially instantaneous magnitude of said sampled second signal, thereby deriving multiple values A that each represent the substantially instantaneous magnitude of said sampled second signal;
   (d) determining a Discrete Fourier Transform (DFT) value for each said sampled second signal A over at least one complete period of said second frequency, thereby deriving multiple DFT values B;
   (e) after all samples are taken for a predetermined sample period, determining real and imaginary components of said multiple DFT values B, thereby deriving multiple values C;
   (f) determining a magnitude of a spectral component of said multiple values C, thereby deriving multiple values D; and
   (g) using one of said values D to substantially represent a steady state signal magnitude that is used as a representation of a signal strength of said second signal over the sampling time interval, and thereby determining a relative strength of said received modulated electromagnetic signal.

2. The method as recited in claim 1, further comprising the step of: performing a partial summation of said multiple values A, thereby deriving said multiple values B.

3. The method as recited in claim 1, wherein said sampling step occurs by use of: (a) an analog-to-digital converter; and (b) a processing circuit.

4. The method as recited in claim 1, wherein said converting step of the first electrical signal derives both said second signal and a third signal, in which said second signal is generated by a first set of a plurality of photodetector elements and said third signal is generated by a second set of the plurality of photodetector elements;
   further comprising:
   (h) performing steps (c) through (g) for said third signal, thereby determining a relative strength of said received modulated electromagnetic signal for both said second signal and said third signal; and
   (i) determining a position where said electromagnetic laser signal physically impacts said plurality of photodetector elements, based on said value E for both said second signal and said third signal.

5. The method as recited in claim 4, wherein said first set of the plurality of photodetector elements and said second set of the plurality of photodetector elements both have predetermined common photodetector elements.

6. The method as recited in claim 1, wherein said sampling rate of said second signal is sixteen samples per period of said second frequency, and said samples are taken over four complete periods of said second frequency.

7. The method as recited in claim 6, wherein the step of performing a partial summation of said multiple values A comprises using only the first sixteen samples of sixty-four available samples taken over said sampling time interval.

8. The method as recited in claim 1, wherein said sampling rate of said second signal is sixteen samples per period of said second frequency, and said samples are taken over a single complete period of said second frequency.

9. The method as recited in claim 1, wherein the step of determining a Discrete Fourier Transform (DFT) value for each said signal A uses only the fourth element of one of said values D.

10. The method as recited in claim 1, wherein the step of determining a Discrete Fourier Transform (DFT) value for each said sampled second signal A uses an equation of the form:

$$X(mF) = \sum_{n=0}^{N-1} x(nT)e^{-j2\pi mnFT}$$

where:
X=spectral component in the frequency domain;
x=input signal (A) in the time domain;
n=input sample number;
m=frequency component sample number;
T=time increment between successive input signal samples (sampling interval (T=1/fs));
fs=sampling frequency;
F=frequency increment between successive spectral components (fundamental frequency of the signal (F=1/tp));
tp=overall sampling interval time (for 64 samples, for example);
N=number of signal input samples (N=1/FT=fs*tp).

11. The method as recited in claim 10, further comprising a step of determining a magnitude of the spectral component, using an equation of the form:

$$|X(mF)| = \sqrt{\left(\sum_{n=0}^{N-1} x(nT)\cos\left(\frac{2\pi mn}{N}\right)\right)^2 + \left(-j\sum_{n=0}^{N-1} x(nT)\sin\left(\frac{2\pi mn}{N}\right)\right)^2}.$$

12. The method as recited in claim 11, wherein the step of performing a partial summation of said multiple DFT values uses an equation of the form:

$$b(n) = \sum_{s=0}^{3} x(16s+n) \text{ where } 0 \le n \le 15$$

where b=a partial summation (or "bin") of the input signal, in the time domain; and yields the following equation for the fourth element:

$$|X(4)| = \sqrt{\left(\sum_{n=0}^{15} b(n)\cos\left(\frac{\pi n}{8}\right)\right)^2 + \left(\sum_{n=0}^{15} b(n)\sin\left(\frac{\pi n}{8}\right)\right)^2}.$$

13. The method as recited in claim 12, wherein the step of determining real and imaginary components of said multiple DFT values B uses equations of the form:

$$X_R = \sum_{n=0}^{15} b(n)\cos\left(\frac{\pi n}{8}\right)$$

and $$X_I = \sum_{n=0}^{15} b(n)\sin\left(\frac{\pi n}{8}\right)$$

where $X_R$ and $X_I$ are, respectively, the real and imaginary parts of said spectral component, which optimize into the following equations:

$$X_R = b(0) - b(8) + \sin\left(\frac{\pi}{8}\right)(b(3) - b(5) - b(11) + b(13)) +$$
$$\sin\left(\frac{2\pi}{8}\right)(b(2) - b(6) - b(10) + b(14)) +$$
$$\sin\left(\frac{3\pi}{8}\right)(b(1) - b(7) - b(9) + b(15))$$

and $$X_I = b(4) - b(12) + \sin\left(\frac{\pi}{8}\right)(b(1) + b(7) - b(9) - b(15)) +$$
$$\sin\left(\frac{2\pi}{8}\right)(b(2) + b(6) - b(10) - b(14)) +$$
$$\sin\left(\frac{3\pi}{8}\right)(b(3) + b(5) - b(11) + b(13)).$$

14. The method as recited in claim 13, wherein the step of determining a magnitude of a spectral component of said multiple values C uses an equation of the form:

$$|X(4)| = \sqrt{(X_R)^2 + (X_I)^2}.$$

15. A modulated light detector, comprising:
(a) at least one light photosensor, which generates at least one first electrical signal when receiving modulated light energy having at least one predetermined range of wavelengths and at least one predetermined range of modulation frequencies;
(b) a first filter circuit having a predetermined frequency characteristic, which receives said at least one first electrical signal and outputs a filtered at least one second signal;
(c) an intermediate frequency stage that (i) mixes said at least one second signal with a predetermined third signal to create a mixed signal, (ii) filters said mixed signal, and (iii) outputs at least one fourth signal, which has a substantially predetermined lower frequency component of said mixed signal; and
(d) a processing circuit that is configured to:
  (i) receive said at least one fourth signal and sample it at a rate that is an integer multiple of said frequency of the substantially predetermined lower frequency component of said mixed signal;
  (ii) determine a substantially instantaneous magnitude of said sampled at least one fourth signal, thereby deriving multiple values A that each represent the substantially instantaneous magnitude of said sampled at least one fourth signal;
  (iii) determine a Discrete Fourier Transform (DFT) value for each said sampled second signal A over at least one complete period of said second frequency, thereby deriving multiple DFT values B;
  (iv) after all samples are taken for a predetermined sample period, determine real and imaginary components of said multiple DFT values B, thereby deriving multiple values C;
  (v) determine a magnitude of a spectral component of said multiple values C, thereby deriving multiple values D; and
  (vi) use one of said values D to represent a substantially steady state signal magnitude that is used as a representation of a signal strength of said at least one fourth signal, and thereby determine a relative strength of said received modulated light energy.

16. The modulated light detector as recited in claim 15, wherein said processing circuit is further configured to: perform a partial summation of said multiple values A, thereby deriving said multiple values B.

17. The modulated light detector as recited in claim 15, wherein said at least one light photosensor comprises one of:
(a) an array of photodiodes that outputs at least two channels of photosensor signal information which comprises said at least one first electrical signal;
(b) an array of photodiodes and a switching circuit that outputs at least two channels of photosensor signal information which comprises said at least one first electrical signal; and
(c) an array of photodiodes that operates as a proportional beam detector that forms an optical split-cell, and which outputs two channels of photosensor signal information which comprises said at least one first electrical signal.

18. The modulated light detector as recited in claim 15, wherein said at least one light photosensor outputs one of said at least one first electrical signal; and further comprising: a plurality of analog switches that, under the control of a processing circuit, connects each of said plurality of photocells to one of: (i) a channel 1 signal and (ii) a channel 2 signal, wherein said channel 1 signal and said channel 2 signal are indicative of said relative position of said received modulated light energy impacting on said at least one light photosensor.

19. The modulated light detector as recited in claim 15, wherein said intermediate frequency stage includes:
 (a) a mixer circuit that creates said mixed signal, and outputs both a higher frequency component signal and a lower frequency component signal;
 (b) one of (i) a low pass filter circuit; and (ii) a bandpass filter circuit; wherein said higher frequency component signal is filtered out, leaving only said substantially predetermined lower frequency component of said mixed signal; and
 (c) a high-gain amplifier circuit.

20. The modulated light detector as recited in claim 15, wherein:
 (a) said at least one light photosensor comprises at least three individual photodetector elements; and
 (b) said processing circuit determines a position where said electromagnetic laser signal physically impacts said at least three photodetector elements, based on said value D for at least two of said at least one first electrical signal.

21. The modulated light detector as recited in claim 15, wherein said processing circuit comprises at least one of: (a) a sequential processing unit; (b) a parallel processing unit; and (c) a state machine.

* * * * *